(12) United States Patent
Ohkawa et al.

(10) Patent No.: US 10,899,162 B2
(45) Date of Patent: Jan. 26, 2021

(54) LAMINATES, IDENTIFICATION DOCUMENTS, AND METHODS FOR VERIFYING IDENTIFICATION DOCUMENTS

(71) Applicant: TOPPAN PRINTING CO., LTD., Tokyo (JP)

(72) Inventors: Mihoko Ohkawa, Tokyo (JP); Kazuyo Minowa, Tokyo (JP)

(73) Assignee: TOPPAN PRINTING CO., LTD., Tokyo (JP)

(*) Notice: Subject to any disclaimer, the term of this patent is extended or adjusted under 35 U.S.C. 154(b) by 0 days.

(21) Appl. No.: 16/790,429

(22) Filed: Feb. 13, 2020

(65) Prior Publication Data

US 2020/0180346 A1    Jun. 11, 2020

Related U.S. Application Data

(63) Continuation of application No. PCT/JP2018/031046, filed on Aug. 22, 2018.

(30) Foreign Application Priority Data

Aug. 23, 2017 (JP) .................................. 2017-160323
Aug. 24, 2017 (JP) .................................. 2017-161113

(Continued)

(51) Int. Cl.
*B42D 25/378* (2014.01)
*G06K 7/14* (2006.01)
(Continued)

(52) U.S. Cl.
CPC ......... *B42D 25/378* (2014.10); *G06K 7/1417* (2013.01); *B42D 25/23* (2014.10);
(Continued)

(58) Field of Classification Search
None
See application file for complete search history.

(56) References Cited

U.S. PATENT DOCUMENTS

| 2005/0161512 A1 | 7/2005 | Jones et al. |
| 2006/0249951 A1 | 11/2006 | Cruikshank et al. |
| 2017/0313120 A1 | 11/2017 | Philippe et al. |

FOREIGN PATENT DOCUMENTS

| FR | 3027845 A1 | 5/2016 |
| JP | 2000-293106 A | 10/2000 |

(Continued)

OTHER PUBLICATIONS

International Searching Authority, "International Search Report," issued in connection with International Patent Application No. PCT/JP2018/031046, dated Nov. 6, 2018.

(Continued)

*Primary Examiner* — Kristy A Haupt
(74) *Attorney, Agent, or Firm* — Foley & Lardner LLP

(57) ABSTRACT

A laminate includes: a first laminate member; a second laminate member; and a hidden print formed by printing invisible ink between the first laminate member and the second laminate member. The hidden print is configured to absorb electromagnetic radiation outside the visible range. When irradiated with electromagnetic radiation outside a visible range that has passed through at least one of the first laminate member and the second laminate member, the hidden print absorbs the electromagnetic radiation to thereby show a sign, and, when irradiated with visible light, the hidden print does not show the sign.

9 Claims, 18 Drawing Sheets

(30) Foreign Application Priority Data

Aug. 25, 2017 (JP) ................................ 2017-162415
Jul. 11, 2018 (JP) ................................ 2018-131849

(51) Int. Cl.
- *B42D 25/23* (2014.01)
- *B42D 25/24* (2014.01)
- *B42D 25/324* (2014.01)
- *B42D 25/328* (2014.01)
- *B42D 25/364* (2014.01)
- *B42D 25/373* (2014.01)
- *B42D 25/382* (2014.01)
- *B42D 25/387* (2014.01)

(52) U.S. Cl.
CPC ............ *B42D 25/24* (2014.10); *B42D 25/324* (2014.10); *B42D 25/328* (2014.10); *B42D 25/364* (2014.10); *B42D 25/373* (2014.10); *B42D 25/382* (2014.10); *B42D 25/387* (2014.10)

(56) References Cited

FOREIGN PATENT DOCUMENTS

| | | |
|---|---|---|
| JP | 2003-044257 A | 2/2003 |
| JP | 2012-071477 A | 4/2012 |
| JP | 2013-003535 A | 1/2013 |
| WO | WO-2012/050223 A1 | 4/2012 |
| WO | WO-2013/143009 A1 | 10/2013 |

OTHER PUBLICATIONS

International Searching Authority, "Written Opinion," issued in connection with International Patent Application No. PCT/JP2018/031046, dated Nov. 6, 2018.

Extended European Search Report dated Jul. 27, 2020 for corresponding European Patent Application No. 18847317.7.

LAMINATES, IDENTIFICATION DOCUMENTS, AND METHODS FOR VERIFYING IDENTIFICATION DOCUMENTS

CROSS-REFERENCE TO RELATED PATENT APPLICATIONS

This application is a continuation application filed under 35 U.S.C. § 111(a) claiming the benefit under 35 U.S.C. §§ 120 and 365(c) of International Patent Application No. PCT/JP2018/031046, filed on Aug. 22, 2018, which is based upon and claims the benefit of priority to Japanese Patent Application No. 2017-160323, filed on Aug. 23, 2017; Japanese Patent Application No. 2017-161113, filed on Aug. 24, 2017; Japanese Patent Application No. 2017-162415, filed on Aug. 25, 2017; and Japanese Patent Application No. 2018-131849, filed on Jul. 11, 2018, the disclosures of which are all incorporated herein by reference in their entireties.

TECHNICAL FIELD

Embodiments of the present invention disclose laminates, identification documents, and methods for verifying identification documents.

BACKGROUND

For identification documents such as cards and passports, use of a medium having a security patch enclosed therein has been known. Such a security patch for identification documents is not subject to alteration by chemicals or abrasion compared with a security patch positioned on a surface of a medium. Further, such a security patch for identification documents is less likely to be falsified, and less likely to be removed in an unauthorized manner from the identification documents.

Meanwhile, in order to protect identification documents from unauthorized duplication, laser engraving is applied to production of identification documents. In this case, identification documents include a chromogenic layer having a characteristic of being carbonized by absorbing a laser beam of a predetermined wavelength. In laser engraving, such a chromogenic layer is irradiated with a laser beam so that part of the chromogenic layer is changed to a black color to thereby record information in the identification document. According to laser engraving, different information can be written in each identification document. Therefore, owner's information that is difficult to make an unauthorized duplication or falsification of, such as the owner's face or signature, is often recorded in the identification document by laser engraving (see for example PTL 1).

[Citation List] [Patent Literature] PTL 1: WO-2012/050223-A1

SUMMARY OF THE INVENTION

Technical Problem

In order to protect identification documents from counterfeiting and take measures against unauthorized use of counterfeit identification documents, new techniques are still required. Such a situation also applies to laminates having a hidden print.

Embodiments of the present invention provide laminates, identification documents, and methods for verifying identification documents to prevent unauthorized use of counterfeits.

Solution to Problem

A laminate for solving the above problem includes: a first laminate member; a second laminate member; and a hidden print formed by printing invisible ink between the first laminate member and the second laminate member. The hidden print is configured to absorb electromagnetic radiation outside a visible range. When irradiated with electromagnetic radiation outside the visible range that has passed through at least one of the first laminate member and the second laminate member, the hidden print absorbs the electromagnetic radiation to thereby show a sign, and, when irradiated with visible light, the hidden print does not show the sign.

An identification document for solving the above problem is an identification document obtained by personalizing the above laminate, wherein the identification document includes owner's information for identifying an owner of the identification document.

According to these configurations, the hidden print is not externally visible when observed while being irradiated with visible light. Accordingly, if not informed in advance that the laminate includes the hidden print, the observer would be highly unlikely to notice the presence of the hidden print when observing the laminate. For this reason, even if a counterfeit laminate is obtained by counterfeiting the above laminate, it is highly likely that it includes the first laminate member and the second laminate member but does not include the hidden print. Therefore, authenticity of the laminate can be determined by examining whether or not the laminate includes the hidden print. Since a counterfeit laminate can be detected by the presence or absence of the hidden print, unauthorized use of counterfeits can be prevented.

An identification document for improving or even solving the above problem is an identification document obtained by personalizing the above laminate, wherein the chromogenic laminate member includes owner's information for identifying an owner of the identification document as a part that develops color when irradiated with the laser beam, and the hidden print includes a code including information associated with the owner's information.

According to the above configuration, authenticity of the identification document can be determined by comparing the owner's information of the chromogenic laminate member with the code information included in the hidden print, in addition to whether the laminate includes the hidden print. Accordingly, unauthorized use of counterfeits can be more reliably reduced or prevented.

A method for verifying an identification document for solving the above problem includes: authenticating the identification document that includes a hidden print and a light-developing region by using an absorption wavelength or a color development wavelength of the hidden print, the hidden print including owner's information and at least part of a machine-readable code recorded therein, and the light-developing region including the owner's information which corresponds to that in the code and a human-readable character string recorded therein; reading the owner's information from the code where it is recorded by using a reader; displaying the owner's information read by the reader on a display as visible information; and comparing the displayed visible information with the owner's information of the light-developing region to determine authenticity of the identification document.

According to the above configuration, authenticity of the identification document can be determined by comparing the visible information based on the hidden print with the owner's information of the light-developing region. Accordingly, unauthorized use of identification documents can be reduced or even prevented.

DETAILED DESCRIPTION

Figure 1:
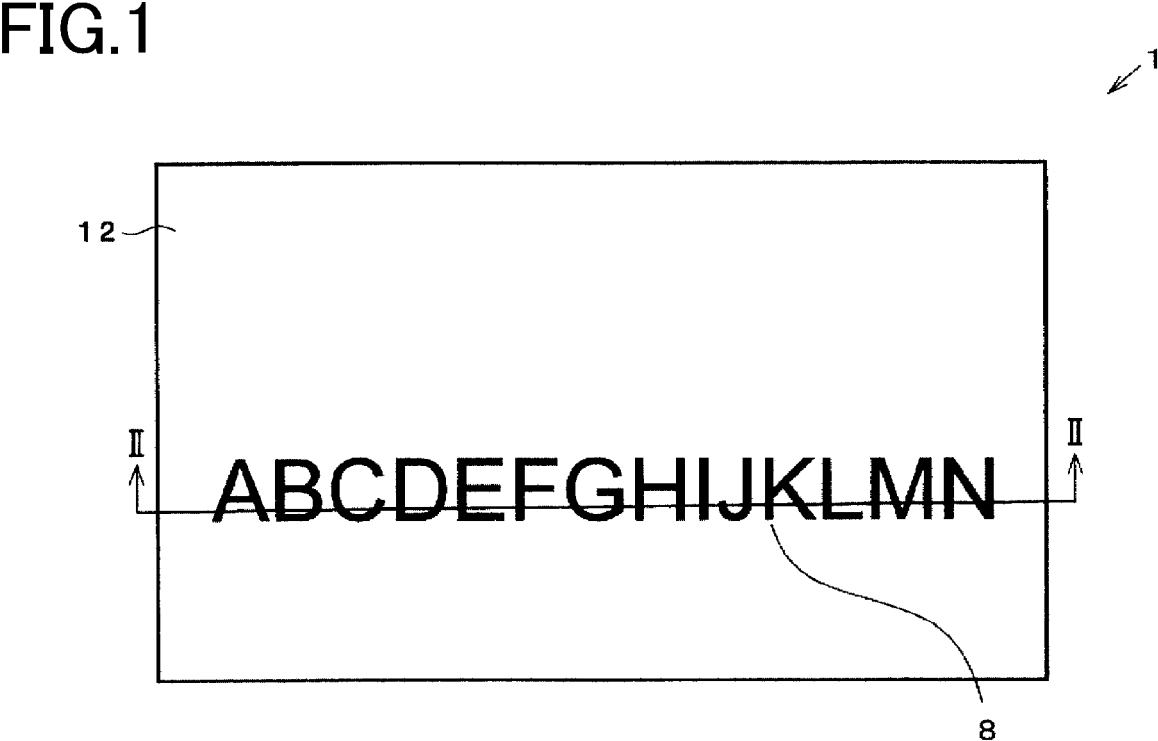
FIG. 1 is a schematic plan view illustrating a structure of a laminate having a first configuration of a first embodiment as viewed in a direction perpendicular to a second laminate member.

With reference to the accompanying Figures, a description will now be given of representative embodiments according to the present invention. The present invention is not limited to the following representative embodiments, and appropriate modifications can be made without departing from the spirit of the present invention. The representative embodiments described below are merely examples of the present invention, and the design thereof could be appropriately changed by one skilled in the art. Here, the drawings are schematic, and the relationship between thickness and plane size, the ratio of the thickness of each layer, etc., may be different from actual ones. The embodiments described below are merely examples of the configurations for embodying the technical idea of the present invention, and the technical idea of the present invention should not limit the materials, shapes, structures, and the like of the components to those described below. The technical idea of the present invention can be modified in various ways within the technical scope specified by the claims.

The same constituent elements are denoted by the same reference numerals unless there is a reason for the sake of convenience, and redundant description is omitted. In the drawings referred to in the following description, for clarity, characteristic parts are enlarged, and thus the components are not shown to scale. It is, however, clear that one or more embodiments can be implemented without such details. In addition, known structures and devices may be schematically represented for simplicity.

First Embodiment of Present Invention

With reference to FIGS. 1 to 21, a laminate, an identification document, and a method for verifying an identification document will be described. In the following description, structures, materials, functions, effects, and examples of the laminate or the identification document of the present invention will be described. The present embodiment includes five configurations. These configurations of the laminate or the identification document of the present embodiment can be combined with one another. The combined configurations can retain the respective functions and benefits. With these combinations, synergistic functions and benefits can be achieved.

A laminate includes a first laminate member, a second laminate member, and a hidden print. The hidden print is positioned between the first laminate member and the second laminate member, and laminated with these laminate members. The hidden print absorbs electromagnetic radiation outside the visible range that has passed through at least one of the first laminate member and the second laminate member to thereby show a sign. In addition, when observed by irradiating light different from light that is outside a predetermined visible range, the hidden print does not form a sign and does not show the sign. Hereinafter, referring to FIGS. 1 to 21, a laminate, and an identification document including the laminate are described in detail.

An identification document may be a personal identification document. The personal identification document may be an ID card, a national ID card, a passport card, a license (e.g., driver's license), or the like. Alternatively, the identification document may be a page of a booklet. The booklet may be a passport booklet or the like. The identification document may be a personalized laminate. The laminate may be a card or a page.

First Configuration of First Embodiment

With reference to FIGS. 1 to 4, a laminate having a first configuration of the present embodiment will be described.

As shown in FIG. 1, the laminate 1 may be a card. In plan view perpendicular to a second laminate member 12 included in the laminate 1, an observer can see a printing 8 but cannot see the hidden print by observation with the naked eye under the illumination of visible light. The term "observation with the naked eye" refers to observation by an observer seeing the laminate 1 without imaging or using an optical system or a filter.

Figure 2:
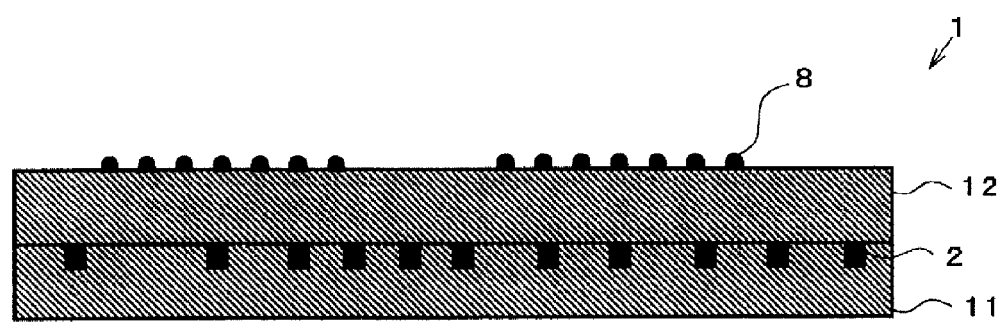
FIG. 2 is a schematic cross-sectional view of the structure taken along the line II-II of FIG. 1.

As shown in FIG. 2, the laminate 1 includes a first laminate member 11, the second laminate member 12, and a hidden print 2. The hidden print 2 is disposed between the first laminate member 11 and the second laminate member 12 in the thickness direction of the laminate 1. The above printing 8 is disposed on a surface of the second laminate member 12 on a side opposite to that in contact with the first laminate member 11. As shown in FIG. 1, the printing 8 includes, for example, a plurality of alphabetic characters. The printing 8 may also include characters other than alphabetic characters, numbers, designs, and the like.

Figure 3:
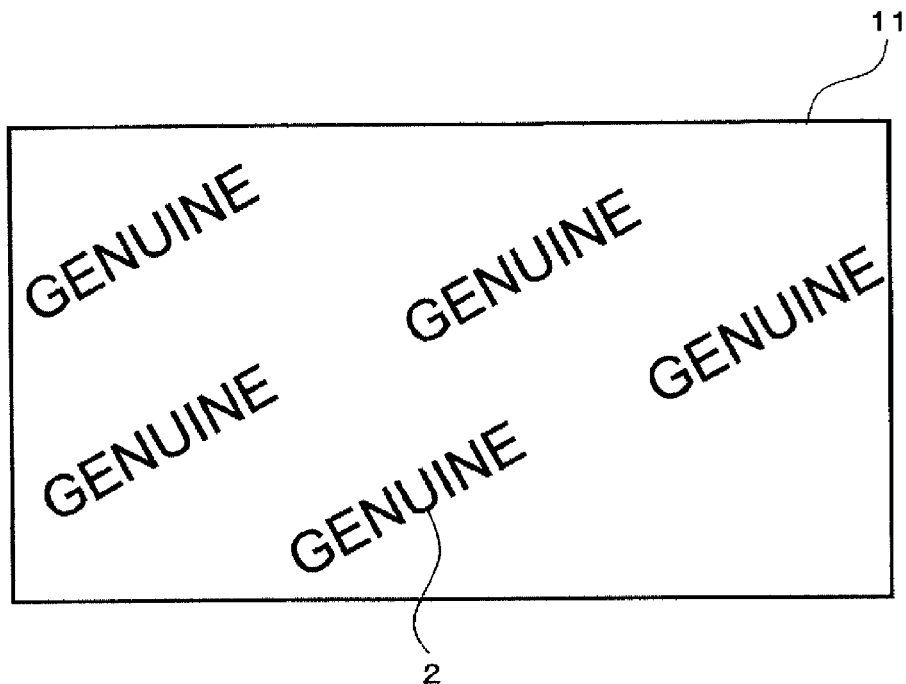
FIG. 3 is a schematic plan view of a hidden print as viewed in a direction perpendicular to a plane in which a first laminate member extends.

As shown in FIG. 3, the hidden print 2 has a shape. In the example illustrated in FIG. 3, the hidden print 2 includes the word "GENUINE" repeated multiple times. In plan view perpendicular to the first laminate member 11, that is, in plan view in the same direction as in FIG. 1, each character forming the word is spaced from one another. FIG. 3 illustrates the hidden print 2 in a visible state.

As described above, the observer can see the printing 8 formed on the second laminate member 12, but cannot see the hidden print 2 with the naked eye. Meanwhile, a sign of the hidden print 2 can be seen via an optical system or a filter. The optical system may be a camera. The camera may be an infrared camera or the like.

Figure 4:
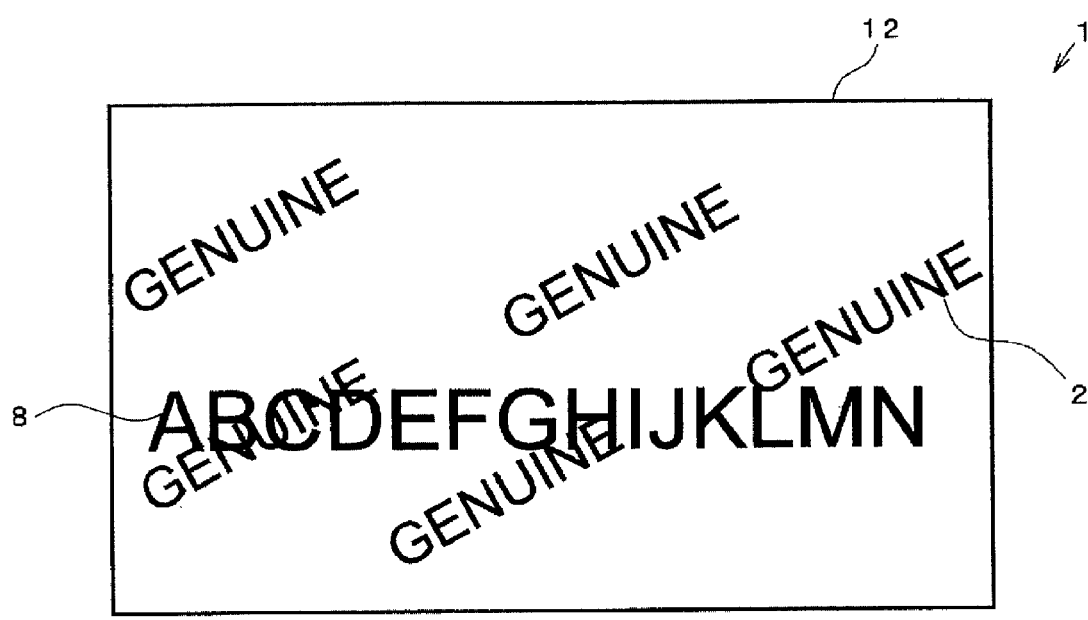
FIG. 4 is a schematic plan view illustrating a sign that is visible when a laminate is imaged by using an infrared camera.

As shown in FIG. 4, an image of both the signs of the hidden print 2 using infrared ink and the printing 8 can be obtained by an infrared camera. Further, under infrared illumination, an image of both the signs of the hidden print 2 using infrared ink and the printing 8 can also be obtained by an infrared camera. The hidden print 2 absorbs infrared radiation and transmits visible light. Further, the printing 8 absorbs infrared radiation and visible light. Accordingly, an image of both the signs of the hidden print 2 and the printing 8 can be obtained by an infrared camera. Further, the first laminate member 11 and the second laminate member 12 may be transparent, opaque, or translucent to visible light. Here, one or both of the first laminate member 11 and the second laminate member 12 may transmit part or all of the infrared wavelength. In addition, the first laminate member 11 and the second laminate member 12 may have infrared transmittance different from each of the hidden print 2 and the printing 8.

Alternatively, the first laminate member 11 and the hidden print 2 may have infrared transmittances different from each other, and the first laminate member 11 and the printing 8 may also have infrared transmittances different from each other. Alternatively, the second laminate member 12 and the hidden print 2 may have infrared transmittances different from each other, and the second laminate member 12 and the printing 8 may also have infrared transmittances different from each other.

According to the first configuration of the present embodiment, the hidden print 2 is not visible when observed in the visible range. Accordingly, if not informed in advance that the laminate 1 includes the hidden print 2, the observer would be highly unlikely to notice the presence of the hidden print 2 when observing the laminate 1. For this reason, even if a counterfeit laminate is obtained by counterfeiting the laminate 1, it is highly likely that it includes the first laminate member 11 and the second laminate member 12 but does not include the hidden print 2. Therefore, authenticity of the laminate 1 can be determined by examining whether or not the laminate 1 includes the hidden print 2. Since a counterfeit laminate 1 can be detected by the presence or absence of the hidden print 2, unauthorized use of counterfeits can be reduced or prevented.

Second Configuration of First Embodiment

With reference to FIGS. 5 to 14, a laminate and an identification document having a second configuration of the present embodiment will be described.

Figure 5:
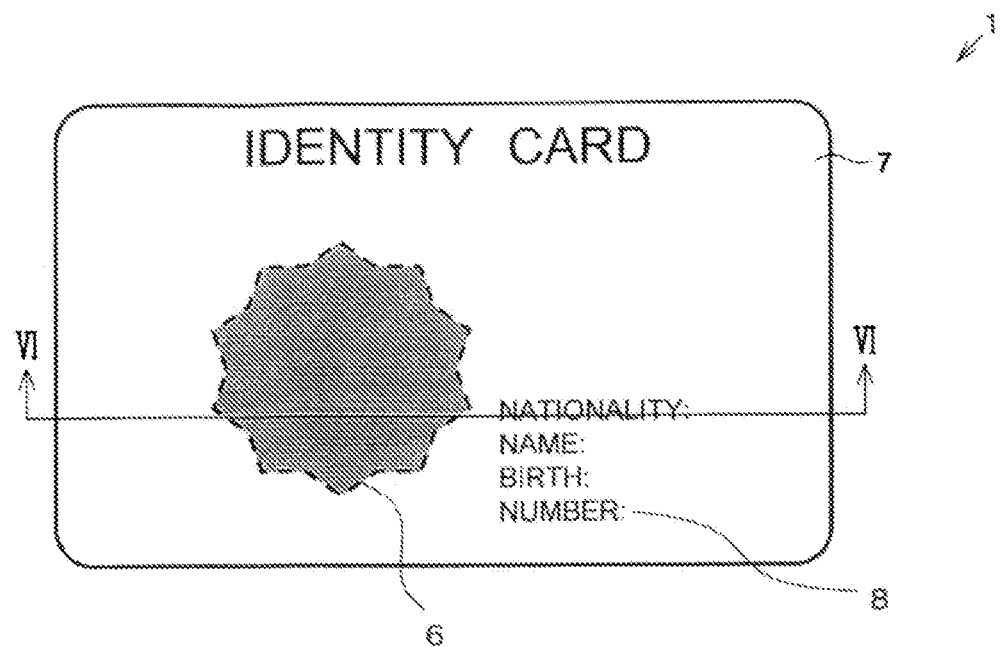
FIG. 5 is a schematic plan view illustrating a structure of a laminate having a second configuration as viewed in a direction perpendicular to a transparent protective laminate member.

As shown in FIG. 5, the laminate 1 may be a card. In plan view perpendicular to a transparent protective laminate member 7 included in the laminate 1, a security patch 6 and the printing 8 are observed at the same time with the naked eye. The term "observation with the naked eye" refers to observation of the laminate 1 under the illumination of light in the visible range without imaging the laminate 1 or using an optical system or a filter as with the first configuration of the present embodiment.

Figure 6:
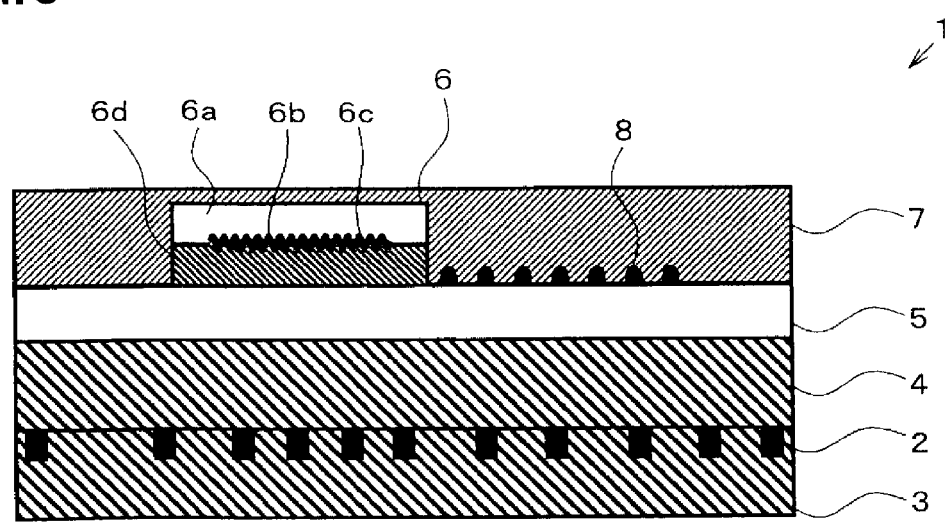
FIG. 6 is a schematic cross-sectional view taken along the line VI-VI of FIG. 5.

As shown in FIG. 6, the laminate 1 includes, as with the first configuration of the present embodiment, a first laminate member 3, a second laminate member 4, and the hidden print 2. The first laminate member 3 and the second laminate member 4 are white laminate members (that is, opaque to visible light). The hidden print 2 is located between the first laminate member 3 and the second laminate member 4. Since both the first laminate member 3 and the second laminate member 4 are white laminate members, the hidden print 2 is less likely to be externally visible when observed in the visible range, compared with the case in which at least one of the first laminate member 3 and the second laminate member 4 is transparent.

The laminate 1 further includes a chromogenic laminate member 5 that exhibits color when irradiated with a laser beam, the printing 8, and a security patch 6. The chromogenic laminate member 5 is in contact with a surface of the second laminate member 4 on a side opposite to that in contact with the first laminate member 3, in other words, opposite to that in contact with the hidden print 2. The printing 8 and the security patch 6 are disposed on a surface of the chromogenic laminate member 5 on a side opposite to that in contact with the second laminate member 4. The laminate 1 further includes the transparent protective laminate member 7 that covers the security patch 6 and the printing 8. That is, the transparent protective laminate member 7 covers portions of the security patch 6 and the printing 8 other than portions in contact with the chromogenic laminate member 5. The transparent protective laminate member 7 can be used as a protective laminate member.

In other words, the second laminate member 4 has a first surface that is in contact with the hidden print 2, and a second surface, which is a surface opposite to the first surface. The laminate 1 includes the chromogenic laminate member 5, the security patch 6, and the transparent protective laminate member 7. The chromogenic laminate member 5 is in contact with the second surface of the second laminate member 4 and exhibits color when irradiated with a laser beam. The security patch 6 is disposed on a surface of the chromogenic laminate member 5 on a side opposite to that in contact with the second surface of the second laminate member 4. The transparent protective laminate member 7 covers the security patch 6, and transmits light in the visible range.

The laminate 1 includes the security patch 6 enclosed between the chromogenic laminate member 5 and the transparent protective laminate member 7, and the chromogenic laminate member 5. It is difficult to counterfeit information recorded on the chromogenic laminate member 5 compared with printing by ink or the like, so counterfeiting of the laminate 1 is more difficult.

The security patch 6 includes a relief layer 6a, a deposition layer 6c, and an adhesive layer 6d. The relief layer 6a includes a relief surface 6b having an uneven surface. The deposition layer 6c covers the relief surface 6b. The adhesive layer 6d covers the entire relief surface 6b. The security patch 6 is adhered to the chromogenic laminate member 5 via the adhesive layer 6d.

Figure 7:
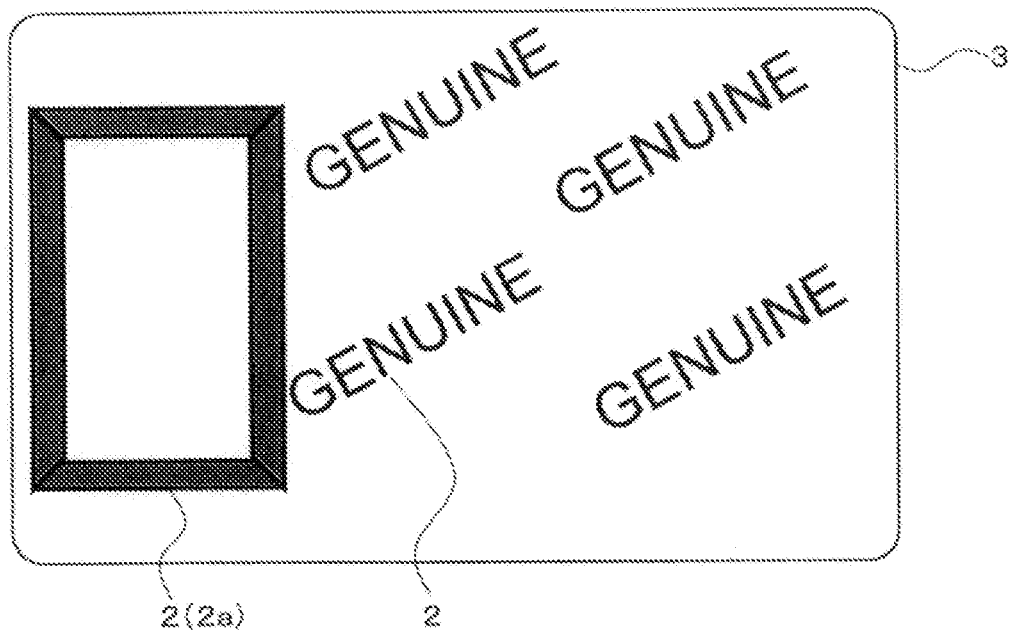
FIG. 7 is a schematic plan view of a hidden print as viewed in a direction perpendicular to a plane in which a first laminate member extends.

As shown in FIG. 7, the hidden print 2 includes the word "GENUINE" repeated multiple times as with the first configuration of the present embodiment. In plan view perpendicular to the first laminate member 3, each word is spaced from one another. The hidden print 2 further includes a frame printing 2a. In plan view perpendicular to a plane in which the first laminate member 3 extends, the frame printing 2a has a frame shape that surrounds a surrounded region. For convenience of description, FIG. 7 illustrates the hidden print 2 in a visible state.

Figure 8:
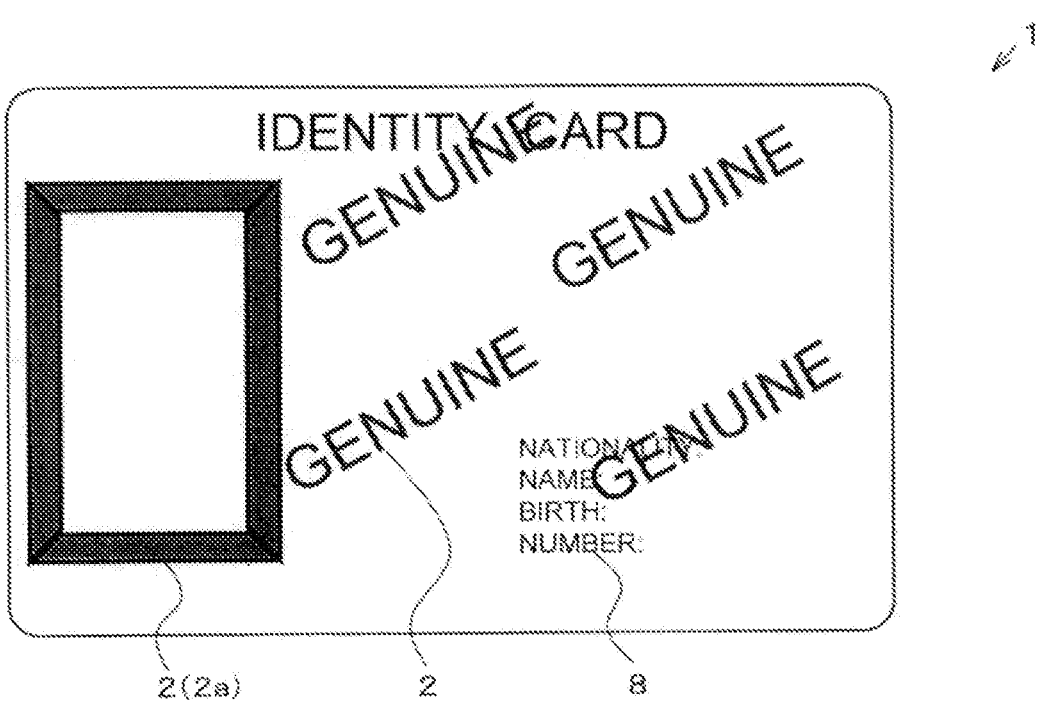
FIG. 8 is a schematic plan view illustrating a sign that is visible when a laminate is imaged by using an infrared camera.

FIG. 8 illustrates the sign in the laminate 1 imaged by an infrared camera or the like when the laminate 1 is irradiated with light. In this case, illumination for imaging is applied on the laminate 1 via a surface of the transparent protective laminate member 7 facing away from the chromogenic laminate member 5, or a surface of the first laminate member 3 facing away from the second laminate member 4. Further, an infrared camera or the like is located at a position on a side of the transparent protective laminate member 7 which does not face the chromogenic laminate member 5.

As shown in FIG. 8, when the laminate 1 is observed, a sign in which the hidden print 2 and the printing 8 overlap each other is observed.

Here, the deposition layer 6c included in the security patch 6 has properties that do not hinder the visibility of the printing 8 and the hidden print 2 in imaging by an infrared camera or the like, and the deposition layer 6c has a shape. Accordingly, when the laminate 1 is imaged by an infrared camera or the like, the deposition layer 6c does not hinder the visibility of the printing 8 and the hidden print 2. More specifically, the deposition layer 6c preferably has a pattern shape having transparency to the observation wavelength band of the laminate 1, or has a pattern shape that does not hinder observation, in other words, that does not hinder the visibility of the printing 8 and the hidden print 2.

FIG. 8 described above illustrates that, while the security patch 6 is visible with the naked eye, the sign of the security patch 6 is not imaged by an infrared camera or the like. Accordingly, in FIG. 8, the security patch 6 does not hinder the visibility of the printing 8 and the hidden print 2 such that the printing 8 and the hidden print 2 are visible from the observer.

Figure 9:
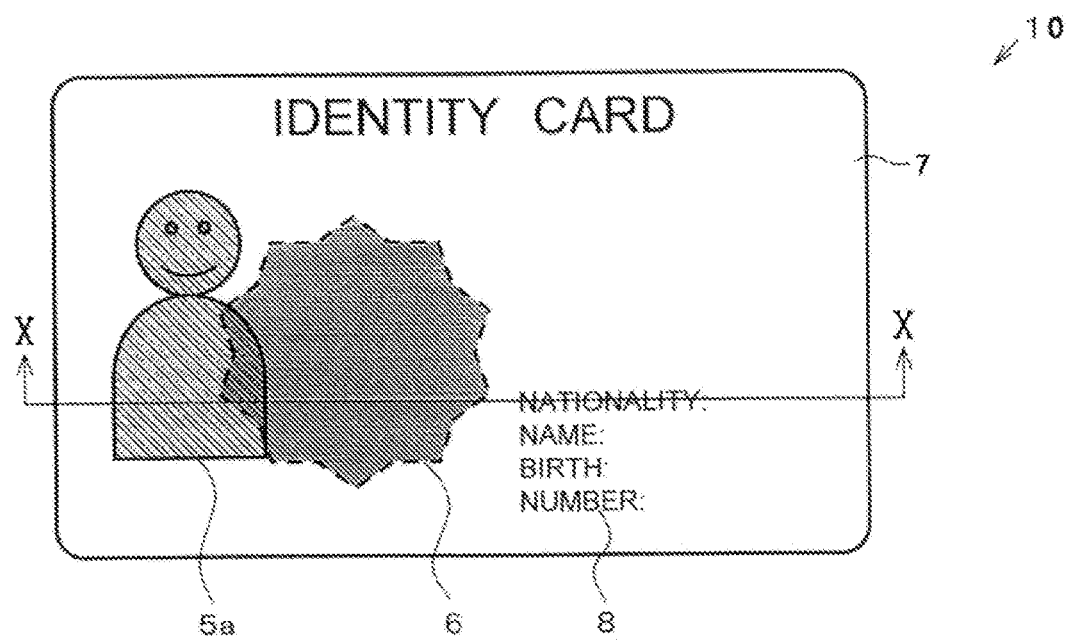
FIG. 9 is a schematic plan view illustrating a structure of an identification document obtained by irradiating a laminate having a second configuration with a laser beam as viewed in a direction perpendicular to a transparent protective laminate member.

FIG. 9 illustrates a planar structure of an identification document 10 obtained by personalizing the laminate 1 having the second configuration of the present embodiment described above. In the identification document 10, when the laminate 1 described in connection with FIGS. 5 to 8 is irradiated with a laser beam, a front surface of the chromogenic laminate member 5, in other words, a region of the chromogenic laminate member 5 including the surface in contact with the transparent protective laminate member 7 exhibits color. By applying a laser beam on the laminate 1, information on the owner of the identification document 10 can be written to the laminate 1. By writing the information on the owner of the identification document 10, the laminate 1 can be personalized. In other words, the identification document 10 obtained by personalizing the laminate 1 has the owner's information written in the laminate 1. Laser engraving can be formed by writing with a laser beam.

As shown in FIG. 9, the identification document 10 includes a light-developing region 5a disposed in the chromogenic laminate member 5. The light-developing region 5a includes owner's information for identifying the owner of the identification document 10. The identification document 10 having the second configuration of the present embodiment includes an identification photo of the owner as the owner's information. The owner's information may be other information than the identification photo of the owner. The owner's information may be the identification photo, name, date of birth, nationality, age, or gender of the owner, or may be a combination thereof.

In plan view perpendicular to the transparent protective laminate member 7, the light-developing region 5a and the security patch 6 partially overlap each other. The light-developing region 5a may be formed at a position that does not overlap the security patch 6 in plan view perpendicular to the transparent protective laminate member 7, or the entire light-developing region 5a may overlap the security patch 6.

Figure 10:
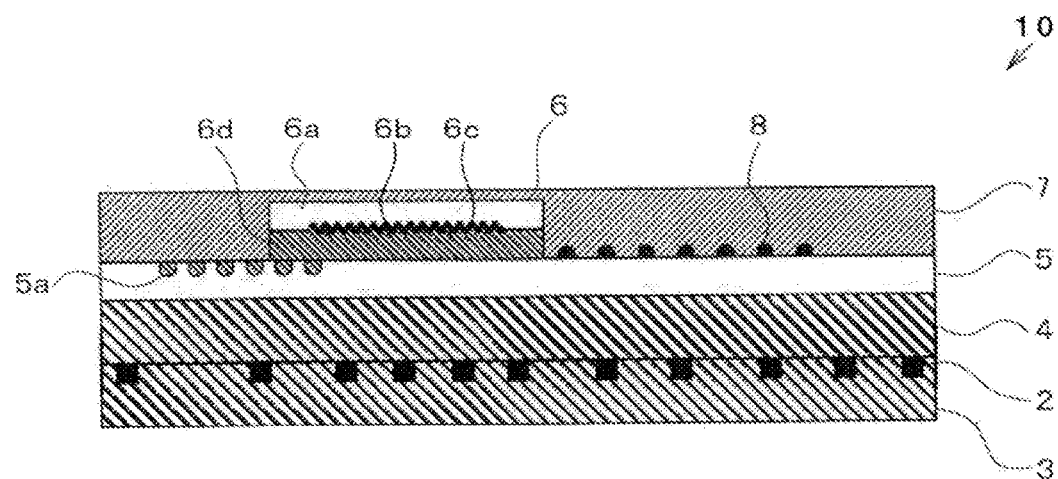
FIG. 10 is a schematic cross-sectional view of the structure taken along the line X-X of FIG. 9.

As shown in FIG. 10, the light-developing region 5a is formed in part of the chromogenic laminate member 5 by irradiation with a laser beam. The light-developing region 5a includes a surface of the chromogenic laminate member 5 in contact with the transparent protective laminate member 7, and is located within the chromogenic laminate member 5 in the thickness direction. Further, the light-developing region 5a may also be located across the entire thickness of the chromogenic laminate member 5. That is, the light-developing region 5a may be in contact with the second laminate member 4 and the transparent protective laminate member 7. Alternatively, the light-developing region 5a may also be located inside from both end faces in the thickness direction of the chromogenic laminate member 5. That is, the light-developing region 5a may not necessarily be in contact with either the second laminate member 4 or the transparent protective laminate member 7.

As described above in connection with FIGS. 7 and 8, the hidden print 2 may include the frame printing 2a. The frame printing 2a can be an alignment mark. In preparation of the light-developing region 5a in the chromogenic laminate member 5, the frame printing 2a can be used as an alignment mark for positioning the light-developing region 5a relative to the chromogenic laminate member 5. In other words, the frame printing 2a of a frame shape is provided on the chromogenic laminate member 5 at a position indicating the light-developing region 5a. Thus, the hidden print 2 can include an alignment mark for positioning the region in which the owner's information is recorded in the identification document 10. Therefore, authenticity of the identification document 10 can be determined on the basis of whether the region in which the owner's information is recorded is deviated from the position of the frame printing 2a of the hidden print 2.

Further, the frame printing 2a may not necessarily be a frame shape, but may be any shape that can determine whether or not the light-developing region 5a is provided at a proper position in the chromogenic laminate member 5. The frame printing 2a may be a register mark, or a straight line, cross, multiple circles, checker pattern, or target mark that indicates the center of the writing position, in other words, the region irradiated with a laser beam. Moreover, the frame printing 2a may also be a combination of straight line, curve, halftone and the like that indicates the region irradiated with a laser beam. The frame printing 2a may be a shape which serves as a mark indicating the position or region irradiated with a laser beam.

When the light-developing region 5a is formed by applying a laser beam on the chromogenic laminate member 5, the light-developing region 5a can be formed in a region of the chromogenic laminate member 5 which is aligned with the frame printing 2a provided in the hidden print 2. Accordingly, the frame printing 2a can be detected by imaging the surface of the transparent protective laminate member 7 facing away from the chromogenic laminate member 5 using an infrared camera while illuminating the identification document 10 with light including infrared radiation via a surface of the transparent protective laminate member 7 facing away from the chromogenic laminate member 5, or a surface of the first laminate member 3 facing away from the second laminate member 4. Then, the light-developing region 5a can be formed by applying a laser beam to the chromogenic laminate member 5 while aligning with the frame printing 2a.

Figure 11:
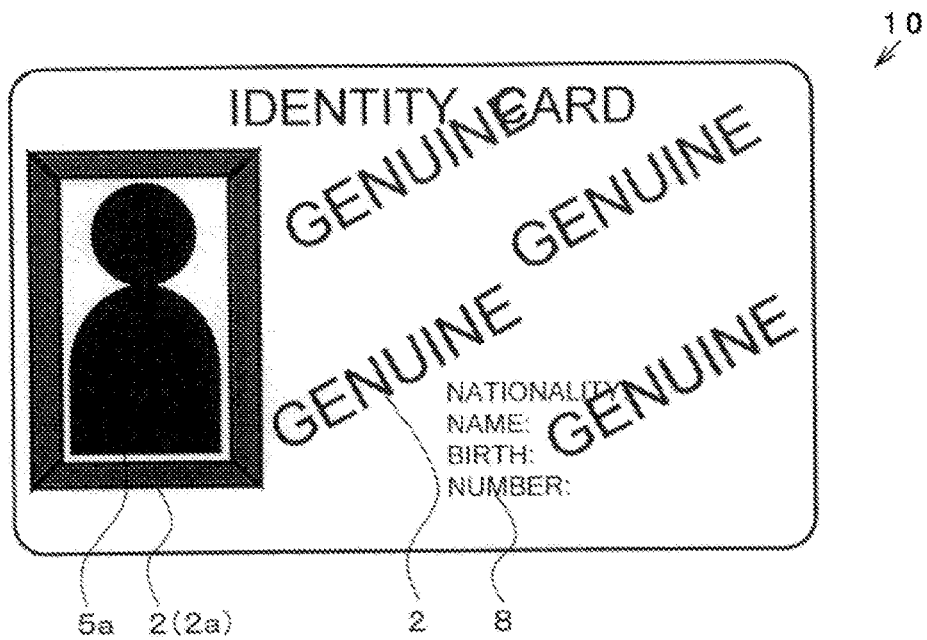
FIG. 11 is a schematic plan view illustrating a sign that is visible when an identification document is imaged by using an infrared camera.

FIG. 11 illustrates the sign on the identification document 10 when imaged by an infrared camera or the like. In this case, illumination light is applied on the identification document 10 via a surface of the transparent protective laminate member 7 facing away from the chromogenic laminate member 5, or a surface of the first laminate member 3 facing away from the second laminate member 4. Further, the sign on the identification document 10 is imaged by an infrared camera or the like located at a position on a side of the transparent protective laminate member 7 which does not face the chromogenic laminate member 5.

As shown in FIG. 11, the observer can observe the sign in which the hidden print 2 and the light-developing region 5a are integrated. More preferably, the light-developing region 5a is located in a surrounded area surrounded by the frame printing 2a of the hidden print 2. As a result, a single sign formed of a combination of a silhouette of the owner and an outer frame surrounding the silhouette can be formed by the light-developing region 5a and the frame printing 2a.

As described above, the hidden print 2 and the light-developing region 5a are aligned using the frame printing 2a as a guide so that a sign in which the hidden print 2 and the light-developing region 5a are integrated can be formed. In addition to that, the hidden print 2 can be associated with the printing 8 via the frame printing 2a by providing the printing 8 while detecting the hidden print 2.

Further, according to the configuration described in connection with FIG. 9, the identification document 10 does not include a layer provided on a surface of the first laminate member 3 on a side opposite to that in contact with the hidden print 2. On the other hand, the identification document 10 may include other layers. These other layers may be a chromogenic laminate member, a transparent protective laminate member, and a print layer. Further, the identification document may also include a single intermediate layer or a plurality of intermediate layers disposed between layers other than between the first laminate member 3 and the second laminate member 4. The intermediate layer may be an anchor layer, an adhesive layer, a receiving layer, a cushion layer, or the like. Furthermore, the intermediate layer may be a multilayer of these layers. Each layer can be formed by applying a polymer resin. The anchor layer can be applied together with an adhesive layer to thereby increase adhesion strength. The adhesive layer adheres layers on both sides thereof. The receiving layer receives ink or the like to form a clear printed design. The cushion layer can buffer external physical impact. Typically, an intermediate layer is not provided between the first laminate member 3 and the second laminate member 4. However, an intermediate layer for promoting adhesion between the first laminate member 3 and the second laminate member 4 may be provided.

Hereinafter, with reference to FIGS. 12 to 14, an example of falsification of the identification card 10 will be described.

Falsification of the identification document 10 may be conducted, for example, by imitating the security patch 6, or removing the security patch 6 from the identification document 10 and affixing it to the chromogenic laminate member 5 while replacing the identification photo of the chromogenic laminate member 5. However, if not informed of the presence of the hidden print 2, a person observing the identification document 10 is highly likely not to notice the hidden print 2 included in the identification document 10. That is, there is high possibility that a forger of the identification document 10 would not notice the hidden print 2 included in the identification document 10. Therefore, when a forger provides an identification photo on a new chromogenic laminate member 5 or on the chromogenic laminate member 5 from which the light-developing region 5a has been removed, the frame printing 2a is not aligned with the identification photo, that is, the light-developing region 5a, since the forger does not recognize the position of the hidden print 2.

Figure 12:
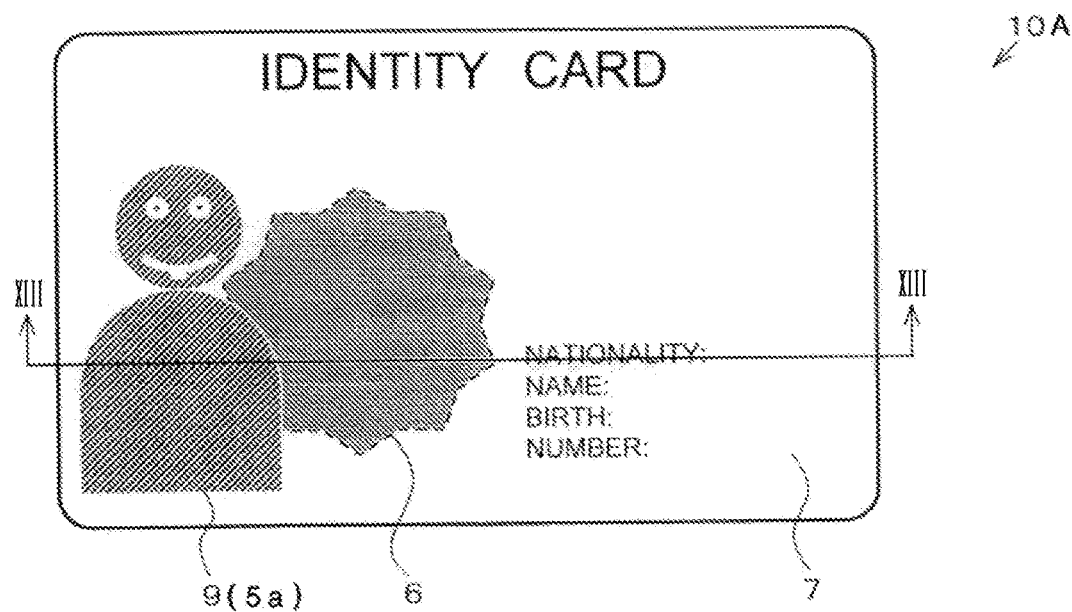
FIG. 12 is a schematic plan view illustrating a structure of a laminate having a second configuration that has been falsified.

As shown in FIG. 12, a falsified sign 9 is formed by irradiating the chromogenic laminate member 5 with a laser beam. A falsified identification document 10A includes the falsified sign 9.

Figure 13:
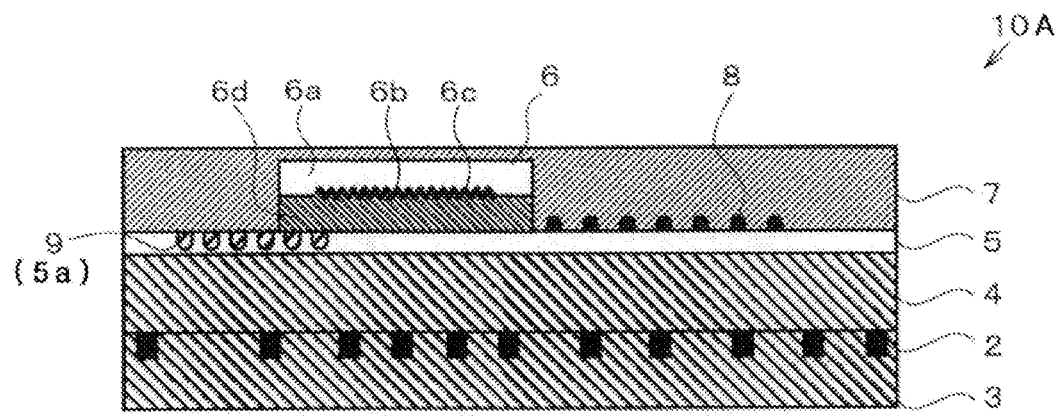
FIG. 13 is a cross-sectional view of the structure taken along the line XIII-XIII of FIG. 12.

As shown in FIG. 13, the light-developing region 5a is formed in the chromogenic laminate member 5. The light-developing region 5a formed in the chromogenic laminate member 5 constitutes the falsified sign 9.

Figure 14:
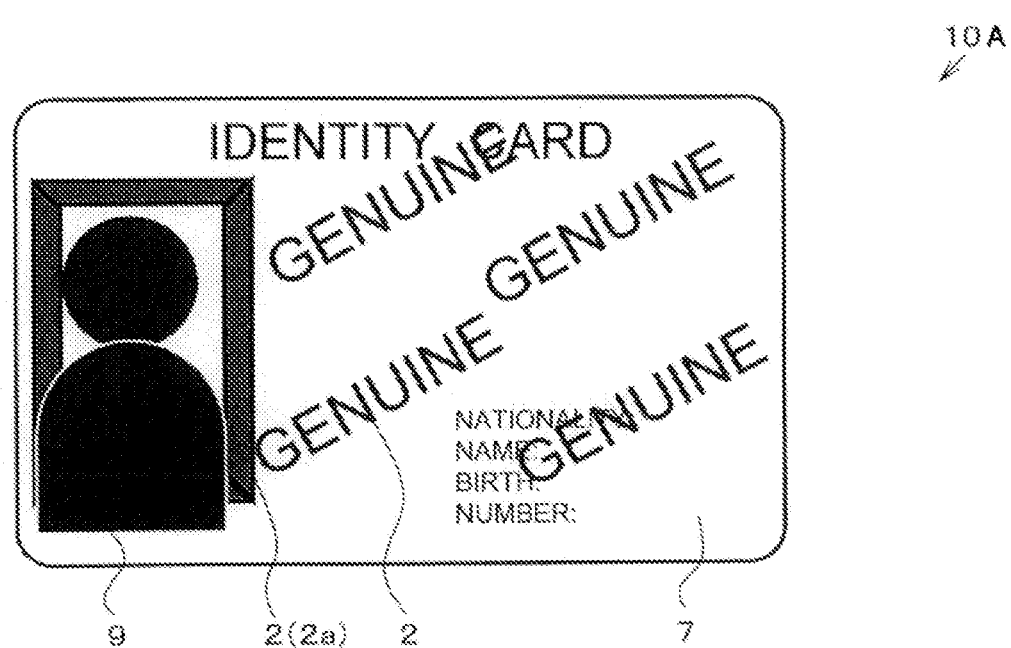
FIG. 14 is a plan view illustrating an exemplary sign that is visible when a falsified identification document is imaged by using an infrared camera.

Similarly to FIG. 11, FIG. 14 illustrates an image of the falsified identification document 10A captured by an infrared camera or the like. In this case, illumination is applied on the falsified identification document 10A via a surface of the transparent protective laminate member 7 facing away from the chromogenic laminate member 5, or a surface of the first laminate member 3 facing away from the second laminate member 4. Further, the image of the falsified identification document 10A is captured by an infrared camera or the like located at a position on a side of the transparent protective laminate member 7 which does not face the chromogenic laminate member 5.

As shown in FIG. 14, the falsified sign 9 is not located at a proper position relative to the frame printing 2a. That is, the falsified sign 9 is misaligned with the frame printing 2a. More preferably, the falsified sign 9 extends beyond the boundary of the frame printing 2a. Thereby, it is found that the falsified sign 9 is written on the chromogenic laminate member 5 without being aligned with the frame printing 2a. That is, on the basis of the relative positions of the falsified sign 9 between the frame printing 2a, it is possible to detect that the falsified identification document 10A has been formed by falsifying a genuine identification document 10.

Furthermore, invisible ink constituting the hidden print 2 can be an ink that transmits visible light. The ink that transmits visible light may be an ink that is transparent, colorless, or pale in color in the visible range. The invisible ink may also be an ink that transmits light of all wavelengths included in the visible range. As a result, it is possible to prevent the hidden print 2 from being visible with the naked eye when the identification document 10 is examined with light transmitted therethrough.

Since the hidden print 2 is formed by printing invisible ink, the hidden print 2 is less likely to be visible when the laminate 1 or the identification document 10 is examined with light transmitted therethrough. Further, when infrared-absorbing ink is used as invisible ink for forming the hidden print 2, the hidden print 2 absorbs light included in the infrared range. Accordingly, the sign of the hidden print 2 can be imaged by an infrared illumination and an infrared camera.

Third Configuration of First Embodiment

Figure 15:
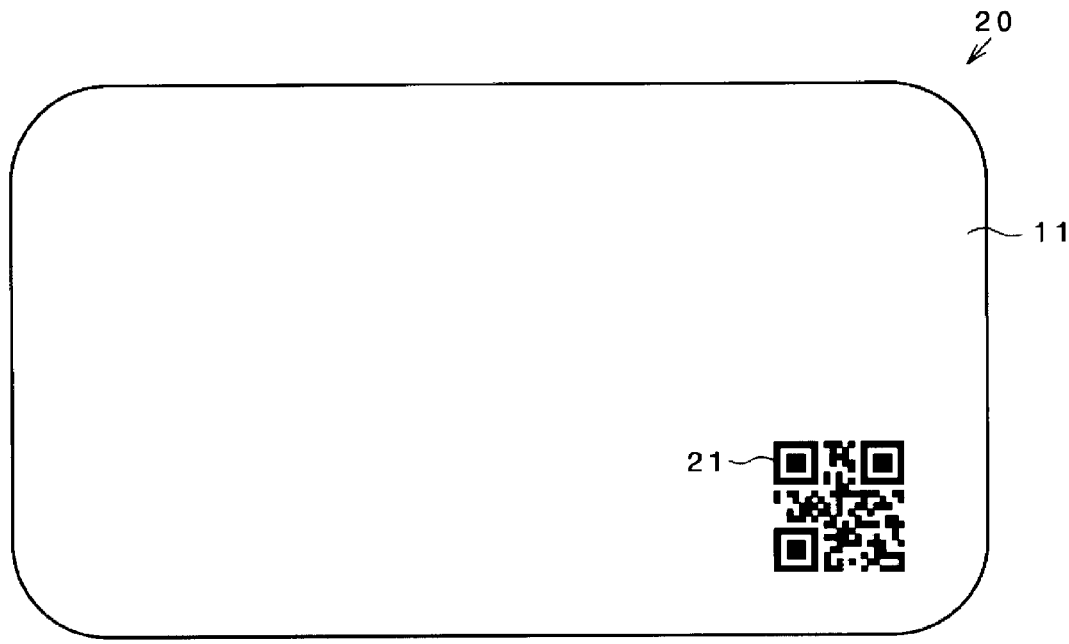
FIG. 15 is a plan view illustrating exemplary hidden print when a laminate having a third configuration is viewed in a direction perpendicular to a second laminate member.
Figure 16:
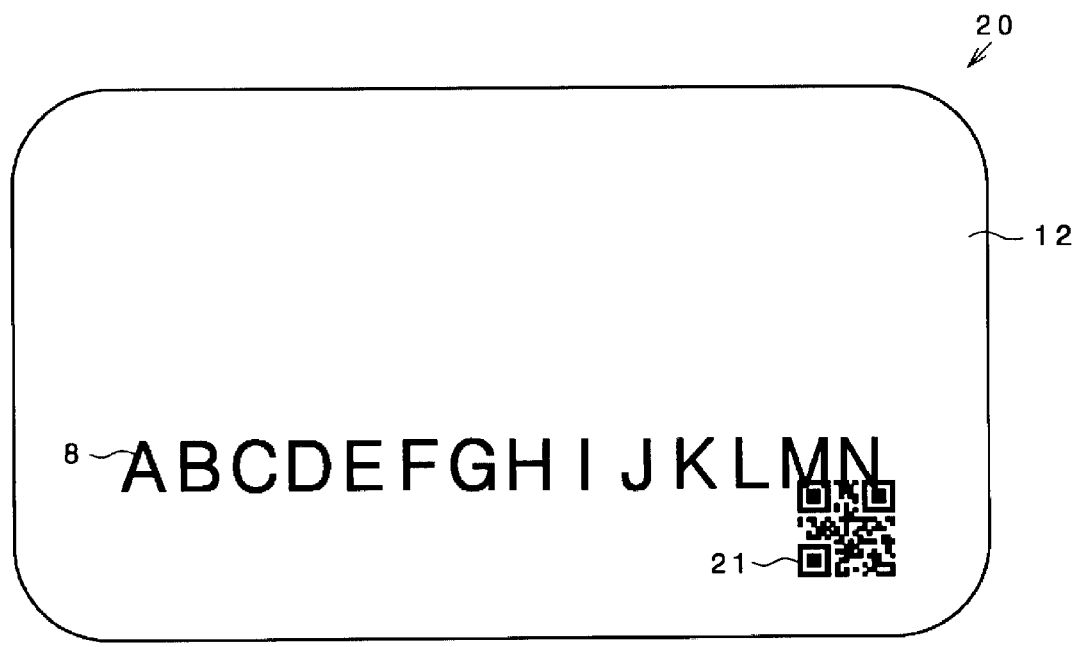
FIG. 16 is a schematic plan view illustrating a sign that is visible when a laminate is imaged by using an infrared camera.

With reference to FIGS. 15 and 16, a laminate having a third configuration of the present embodiment will be described. The third configuration of the present embodiment differs from the first configuration of the present embodiment in the types of signs indicated by the hidden print. Therefore, the difference between the first configuration and the third configuration will be detailed in the following description. In the third configuration of the present embodiment, features which are the same as those of the first configuration of the present embodiment are denoted by the same or similar reference signs to those of the first configuration, and the detailed description thereof will be omitted.

According to a laminate of the third configuration of the present embodiment, coded information is recorded in the hidden print. Hereinafter, referring to FIGS. 15 and 16, the details of a laminate will be described.

FIG. 15 illustrates a planar structure of a laminate. Further, FIG. 15 illustrates the hidden print in a visible state formed in the first laminate member 11. For convenience of description, in FIG. 15, the second laminate member 12 is not illustrated.

As shown in FIG. 15, a laminate 20 includes the first laminate member 11. A machine-readable code is formed as a hidden print 21 in part of the first laminate member 11. In the present embodiment, the hidden print 21 is a two-dimensional barcode. The hidden print 21 may be a two-dimensional matrix barcode, which is a type of the two-dimensional barcode. In the example of the present embodiment, the hidden print 21 is a QR code (registered trademark), which is a type of the two-dimensional matrix barcode. Further, the two-dimensional matrix barcode may also be Datamatrix, VeriCode, or the like. The two-dimensional barcode may also be a two-dimensional stacked barcode. The two-dimensional stacked barcode may be PDF417, CODE49, or the like. Further, the code is not limited to the two-dimensional barcode, and may be a one-dimensional barcode. The one-dimensional barcode is a straight line barcode or the like.

Authenticity of the laminate 20 can also be determined on the basis of whether the hidden print 21 is a code including predetermined information, in addition to whether the laminate 20 includes the hidden print 21. Accordingly, unauthorized use of counterfeits can be reduced or prevented with higher reliability.

Further, the hidden print 21 can transmit light in the visible range, and absorb light in the infrared range. Accordingly, in the visible range, the hidden print 21 is transparent, colorless, or pale in color. Therefore, the observer does not notice that the hidden print 21 is provided on the first laminate member 11.

FIG. 16 illustrates a planar structure of the laminate 20. In FIG. 16, infrared radiation is applied on the laminate 20 via a surface of the first laminate member 11 facing away from the second laminate member 12, or a surface of the second laminate member 12 facing away from the first laminate member 11. In addition, the laminate 20 shown in FIG. 16 is imaged by an infrared camera located at a position on a side of the second laminate member 12 which does not face the first laminate member 11.

As shown in FIG. 16, an image of both the signs of the printing 8 and the hidden print 21 can be obtained by an infrared camera. In the present embodiment, since the printing 8 absorbs light in the visible range and light in the infrared range, the sign image of the printing 8 can be obtained by an infrared camera. The printing 8 may absorb light in the visible range, and may transmit light in the infrared range. Thereby, the sign image of the printing 8 can be obtained by visible light, and the sign image of the printing 8 cannot be obtained in the infrared range.

Fourth Configuration of First Embodiment

Figure 17:
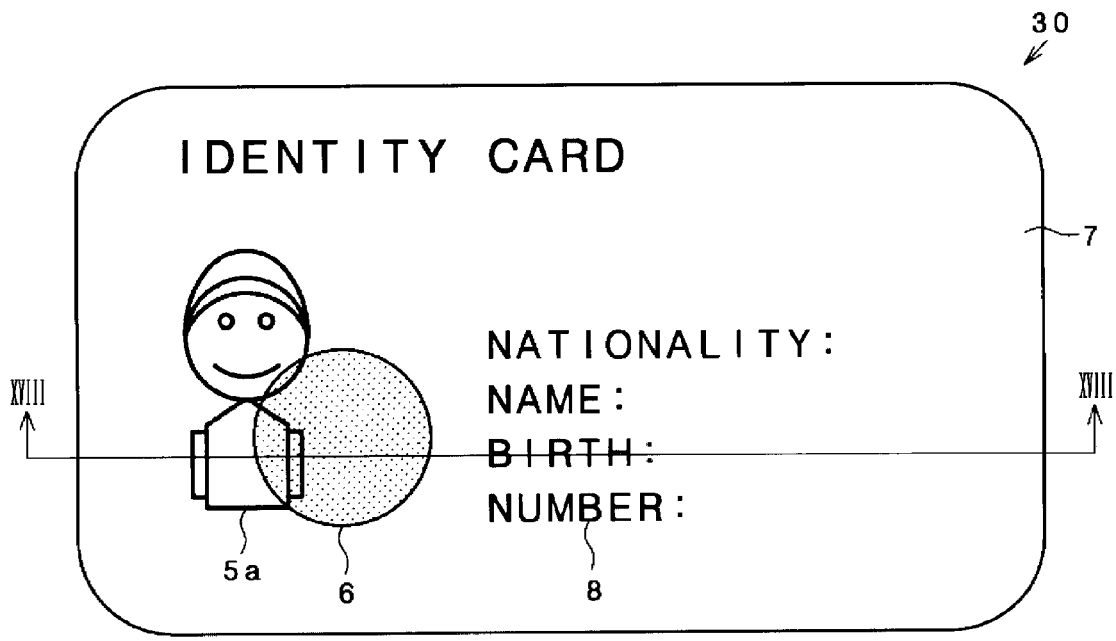
FIG. 17 is a schematic plan view illustrating a structure when an identification document having a fourth configuration is viewed in a direction perpendicular to a transparent protective laminate member.
Figure 18:
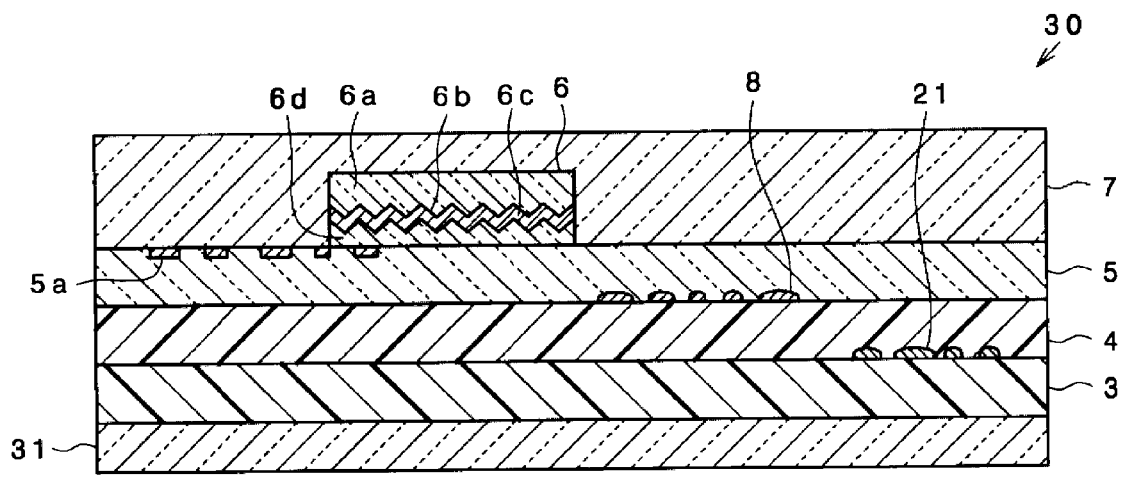
FIG. 18 is a schematic cross-sectional view of the structure taken along the line XVIII-XVIII of FIG. 17.
Figure 19:
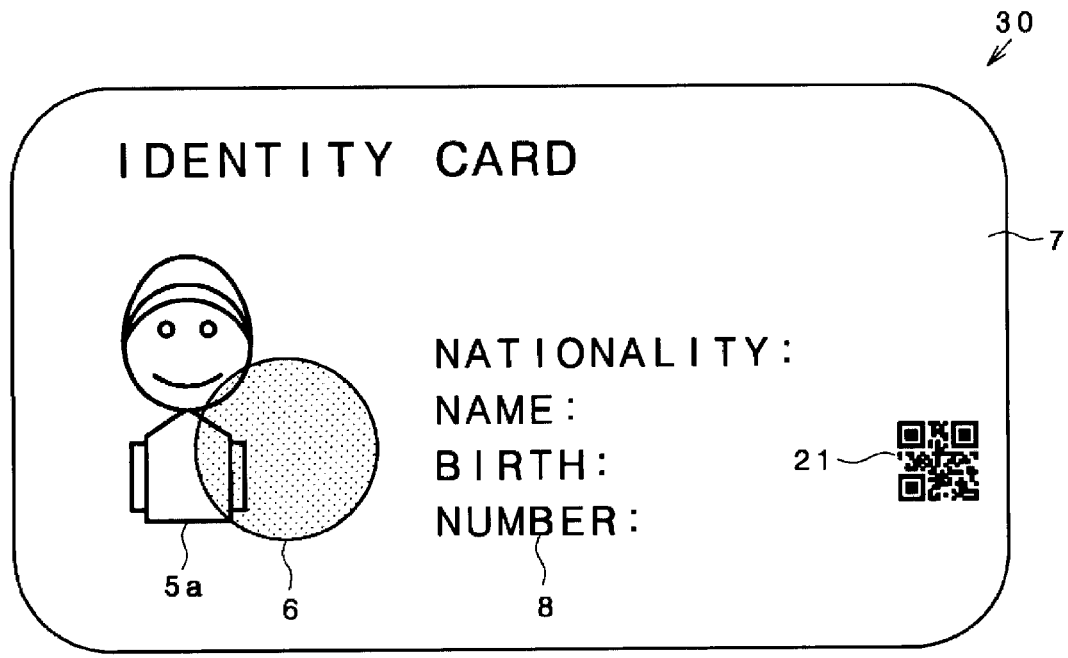
FIG. 19 is a schematic plan view illustrating a sign that is visible when an identification document is imaged by using an infrared camera.

With reference to FIGS. 17 to 19, a configuration of an identification document having a fourth configuration of the present embodiment will be described. The fourth configuration of the present embodiment differs from the third configuration of the present embodiment in that it has owner's information for identifying an individual and a security patch. Further, the fourth configuration of the present embodiment differs from the identification document 10 of the second configuration of the present embodiment in that the hidden print includes coded information. Accordingly, the following description is focused on these differences. Further, features which are the same as those of the second configuration or the third configuration of the present embodiment are denoted by the same or similar reference signs to those of the respective configurations, and the detailed description thereof will be omitted.

As shown in FIG. 17, an identification document 30 includes the printing 8, the light-developing region 5a, and the security patch 6. The printing 8, the light-developing region 5a, and the security patch 6 are visible when the identification document 30 is observed via the transparent protective laminate member 7. In the present embodiment, the printing 8 includes the name of the identification document 30 and the word specifying the type of owner's information. The light-developing region 5a includes an identification photo of the owner of the identification document 30 as the owner's information, as with the second configuration of the present embodiment. Further, the light-developing region 5a may include plain text, that is, unencrypted text as the owner's information.

When viewed in the thickness direction of the identification document 30, the light-developing region 5a and the security patch 6 partially overlap each other. Further, encrypted information of the owner's information included in the printing 8 may be recorded in the security patch 6. The information in the security patch 6 may be a laser engraving.

FIG. 18 illustrates a cross-sectional structure of the identification document 30 taken along the line XVIII-XVIII of FIG. 17.

As shown in FIG. 18, the identification document 30 includes, as with the identification document 10 of the second configuration of the present embodiment, the first laminate member 3, the second laminate member 4, the chromogenic laminate member 5, and the transparent protective laminate member 7. The hidden print 21 is located between the first laminate member 3 and the second laminate member 4. The printing 8 is located between the second laminate member 4 and the chromogenic laminate member 5. The light-developing region 5a is formed in part of the chromogenic laminate member 5. The light-developing region 5a can be formed by irradiation with a laser beam.

In the chromogenic laminate member 5, owner's information is recorded as the light-developing region 5a. The owner's information recorded as the light-developing region 5a is the owner's information of the identification document 30 or the like. As described above, the light-developing region 5a includes an identification photo of the owner, which is an example of the owner's information. The hidden print 21 is a code including information associated with the owner's information. The hidden print 21 may be a code in which all or part of the owner's information is recorded. In the present embodiment, the hidden print 21 is a two-dimensional barcode as with the third configuration of the present embodiment. The hidden print 21 can include pieces of information including those indicative of the age, gender, and name of the owner as the information associated with owner's information.

The hidden print 21 can be read by a reader. The identification document 30 can be authenticated on the basis of an absorption wavelength or a color development wavelength of the hidden print 21. The absorption wavelength refers to a wavelength band that is absorbed by the hidden print 21 from among a predetermined wavelength band of light irradiated to the hidden print 21. Further, the color development wavelength refers to a wavelength band of light emitted by the hidden print 21. Authenticity determination of the identification document 30 can be performed by the following procedure. The identification document for which the following authenticity determination is performed includes the hidden print 21 and the light-developing region 5a. The hidden print 21 includes owner's information, and further includes a machine-readable code recoded therein. The light-developing region 5a includes the owner's information which corresponds to that in the hidden print 21, and further includes a human-readable character string recorded therein.

In authenticity determination, the identification document 30 is first authenticated by using a reader on the basis of the absorption wavelength or color development wavelength of the hidden print 21, and then the owner's information recorded in the hidden print 21 is read from the code by using a reader. Then, the owner's information recorded in the hidden print 21 is displayed as visible information on a display or the like provided on the reader. The displayed visible information is compared with the owner's information recorded in the light-developing region 5a.

Thus, authenticity of the identification document 30 can be determined by comparing the owner's information of the chromogenic laminate member 5 with the code information included in the hidden print 21, in addition to whether the laminate 30 includes the hidden print 21. Accordingly, unauthorized use of counterfeits can be more reliably reduced or prevented.

The identification document 30 further includes a lower protective laminate member 31. The lower protective laminate member 31 is in contact with the first laminate member 3 on a side opposite to that in contact with the second laminate member 4. The lower protective laminate member 31 is transparent, and is a laminate member having the same characteristics as the transparent protective laminate member 7.

FIG. 19 illustrates an image of a plan view of the identification document 30. In FIG. 19, infrared radiation is applied to the identification document 30 via a surface of the lower protective laminate member 31 facing away from the first laminate member 3, or a surface of the transparent protective laminate member 7 facing away from the chromogenic laminate member 5. Further, FIG. 19 illustrates an image of the identification document 30 captured by an infrared camera or the like located at a position on a side of the transparent protective laminate member 7 which does not face the chromogenic laminate member 5.

As shown in FIG. 19, the sign of the hidden print 21, in addition to the printing 8, the light-developing region 5a, and the security patch 6, can be imaged by an infrared camera. Accordingly, authenticity of the identification document 30 can be determined on the basis of the sign of the hidden print 21 of the identification document 30. The identification document 30 can be verified by this authenticity determination.

Fifth Configuration of First Embodiment

Figure 20:
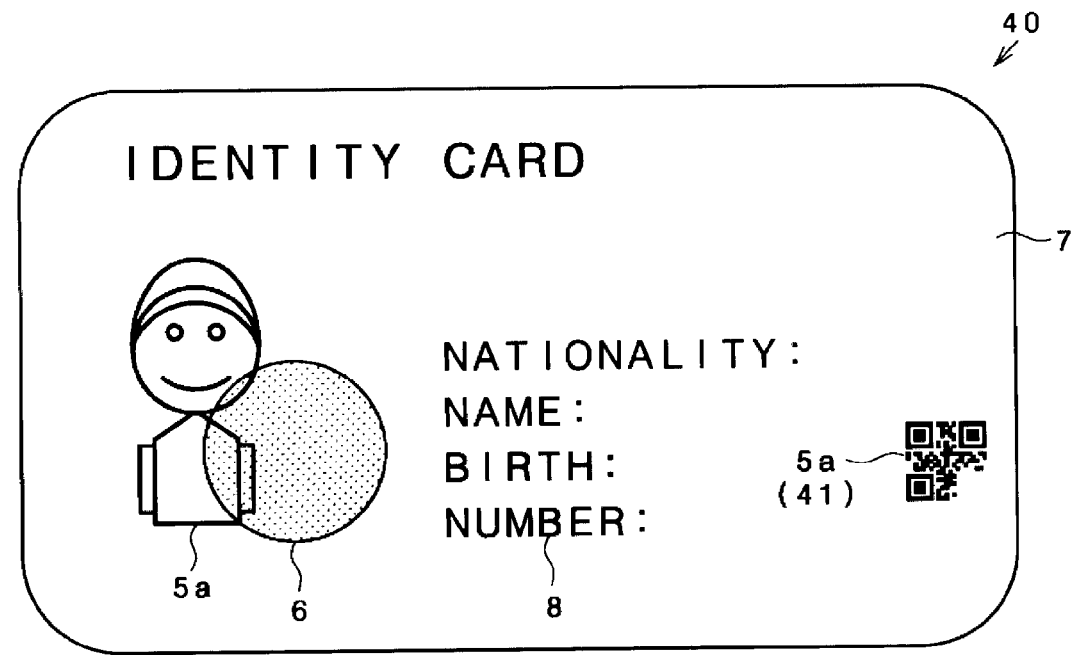
FIG. 20 is a schematic plan view illustrating a structure of an identification document having a fifth configuration as viewed in a direction perpendicular to a transparent protective laminate member.
Figure 21:
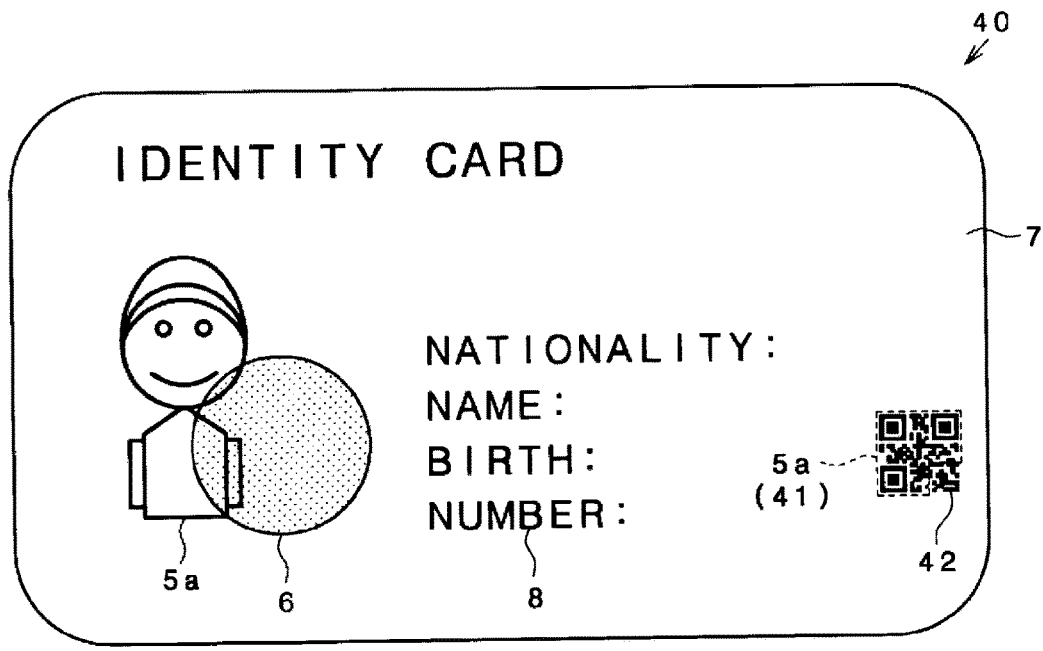
FIG. 21 is a schematic plan view illustrating a sign that is visible when an identification document is imaged by using an infrared camera.

With reference to FIGS. 20 and 21, an identification document having a fifth configuration of the present embodiment will be described. The fifth configuration of the present embodiment differs from the fourth configuration of the present embodiment in the type of code included in the identification document. The following description is focused on these differences. Further, features which are the same as those of the fourth configuration of the present embodiment are denoted by the same or similar reference signs to those of the fourth configuration of the present embodiment, and the detailed description thereof will be omitted.

An identification document includes one integrated code. A first partial code and a second partial code are integrated to form a single integrated code. That is, the first partial code and the second partial code are configured to be integrated to form a single code. A chromogenic laminate member includes a first partial code of the code as a part that develops color when irradiated with a laser beam. The hidden print includes a second partial code of the code. With reference to FIGS. 20 and 21, an identification document having a fifth configuration of the present embodiment will be further detailed below.

FIG. 20 is a plan view of an identification document when the identification document is observed with the naked eye. That is, FIG. 20 illustrates a planar view of an identification document when the identification document is observed under illumination of visible light.

As shown in FIG. 20, an identification document 40 includes the printing 8, the light-developing region 5a, and the security patch 6. The light-developing region 5a includes a first partial code 41 in addition to an identification photo of the owner. The first partial code 41 is part of a two-dimensional barcode. The first partial code 41 solely by itself does not function as a two-dimensional barcode.

FIG. 21 illustrates an image of a plan view of the identification document 40 in infrared radiation. In FIG. 21, infrared radiation is applied via a surface of the lower protective laminate member 31 facing away from the first laminate member 3, or a surface of the transparent protective laminate member 7 facing away from the chromogenic laminate member 5. Further, FIG. 21 illustrates an image of the identification document 40 captured by an infrared camera or the like located at a position on a side of the transparent protective laminate member 7 which does not face the chromogenic laminate member 5.

As shown in FIG. 21, the sign of the hidden print 42, in addition to the printing 8, the light-developing region 5a, and the security patch 6, can be imaged by an infrared camera. The hidden print 42 together with the first partial code 41 included in the light-developing region 5a constitutes a single two-dimensional barcode. The hidden print 42 is an example of the second partial code. Therefore, a readable integrated code in which the first partial code 41 and the second partial code are integrated can be obtained from the identification document 40 by using an infrared camera. With the integrated code in which the first partial code 41 and the second partial code, which is the hidden print 42, obtained by an infrared camera, are provided, authenticity of the identification document 40 can be determined. The identification document 40 can be verified by this authenticity determination.

According to the fifth configuration of the present embodiment, in counterfeiting of the identification document 40, the second partial code and the first partial code 41 included in the chromogenic laminate member 5 are required to complement each other to form a counterfeit of the identification document 40. Therefore, counterfeiting of the identification document 40 is more difficult.

[Material for Forming Laminate]
(Laminate Members)

The laminate members constituting the laminate 1, such as the laminate members 3, 4, 11, 12, and the transparent protective laminate member 7, may be paper or plastic sheets. The laminate members 3, 4, 11, and 12 may be opaque or transparent. Further, when the hidden print 2 absorbs light outside the visible range and emits fluorescence in the visible range, the visibility of the hidden print 2 is improved by the transparent laminate members 3, 4, 11, and 12.

The plastic sheet applied to the laminate member may be a thermoplastic plastic sheet or the like. Examples of the plastic sheet include cellulose sheet, polycarbonate (PC) sheet, polyolefin (PO) sheet, ethylene vinyl alcohol (EVOH) sheet, polyvinyl alcohol (PVA) sheet, polyvinyl chloride sheet, polyethylene naphthalate (PEN) sheet, polyethylene terephthalate (PET) sheet, polyethylene sheet, nylon sheet, acrylic sheet, and triacetyl (TAC) sheet. The polyolefin sheet may be a polyethylene (PE) sheet or a polypropylene (PP) sheet. The polyvinyl chloride sheet, amorphous polyester sheet, and polycarbonate sheet are suitable for processing of integrating the laminate 1 by heat or pressure.

In addition, the opaque white laminate member may be a sheet containing a pigment such as TiO2, or a foamed sheet, in other words, a sheet containing homogeneous bubbles in the sheet. The opaque laminate member may have light scattering characteristics or light reflectivity to a degree that one side of the laminate member cannot be seen through the other side of the laminate member with the naked eye. Further, the second laminate member has infrared transparency or ultraviolet transparency. In addition, the first laminate members 3 and 11 may have infrared transparency or ultraviolet transparency. Thus, the sign indicated by the hidden print 2, 21, and 42 can be identified via the second laminate member.

Further, small pieces whose color shifts may be dispersed in the laminate members 3, 4, 11, and 12. The small pieces may be optically variable ink (OVI) or the like. Thereby, the laminate 1 can have improved security.

The respective laminate members may have a thickness in the range of 25 μm or more and 200 μm or less. When the laminate member has a thickness smaller than 25 μm, the laminate member may have insufficient physical strength. Further, when the laminate member has a thickness smaller than 25 μm, the laminate member may wrinkle when printing or the like is performed on the laminate member. That is, when the laminate member has a thickness of 25 μm or more, the laminate member can have sufficient physical strength and can prevent wrinkles from occurring when printing or the like is performed on the laminate member. On the other hand, when the laminate member has a thickness larger than 200 µm, influence of variation in thickness and flexibility of the laminate member itself may increase when the laminate member is processed. That is, when the laminate member has a thickness of 200 µm or less, influence of variation in thickness and flexibility of the laminate member itself can be reduced during processing of the laminate member. The thickness of the laminate members may also be in the range of 50 µm or more and 150 µm or less.

(Chromogenic Laminate Member)

The chromogenic laminate member 5 is a laminate member that develops color when irradiated with a laser beam. The chromogenic laminate member 5 may be a laminate member that develops color when irradiated with a laser beam in the infrared range. The infrared range is in the range of 700 nm or more and 1200 nm or less. The chromogenic laminate member 5 is produced by adding the following additives as necessary to the plastic that can constitute the above laminate member. The chromogenic laminate member 5 may be opaque or transparent.

The additive may be a material that absorbs a laser beam so that the additive itself develops color, or a material that absorbs a laser beam and generates heat so that the resin around the additive is carbonized.

The additive that absorbs a laser beam and develops color may be a compound or the like containing a heavy metal. The compound containing a heavy metal may be lead carbonate, lead sulfate, lead stearate, white lead, silver acetate, cobalt oxalate, cobalt carbonate, yellow iron oxide, basic bismuth acetate, bismuth hydroxide, nickel acetyl acetate, nickel lactate, cupric citrate, or copper carbonate. These compounds develop color by chemical changes in the crystal structure of metal ions contained in the compound or the hydration amount in the crystals of metal ions.

Examples of the additive that carbonizes the resin around the additive include additives such as silicon-containing inorganic compounds, silicon-containing pigments, non-white metal titanate, black organic dyes, non-black inorganic lead compounds, black lead, carbon black, and graphite, and additives containing at least one of metal hydroxide and metal hydrous compounds and a coloring agent.

The chromogenic laminate member 5 is obtained by processing a plastic containing an additive into a sheet shape. The additive added in production of the chromogenic laminate member 5 can be optionally selected according to the wavelength band of a laser beam applied to the chromogenic laminate member 5, and compatibility with a plastic for forming the chromogenic laminate member 5. The amount of additive to be added can be determined depending on the energy absorption efficiency, printability to the chromogenic laminate member, transferability, physical properties, and the like.

Specifically, the amount of additive may be in the range of 0.1 wt. % or more and 30 wt. % or less relative to the plastic, or the base material. Further, the amount of additive may be in the range of 1 wt. % or more and 10 wt. % or less. When the amount of additive is less than 0.1 wt. %, the color density when a laser beam is irradiated may be lowered compared with the case in which the amount of additive is 0.1% or more. Thereby, the visibility of the region that develops color may be lowered. That is, the amount of additive of 0.1 wt. % or more can prevent the visibility of the region that develops color from being lowered. Further, the amount of additive of more than 30 wt. % or more may decrease the printability and transferability of the chromogenic laminate member 5. In addition, dynamic characteristics of the chromogenic laminate member 5 may also decrease. That is, when the amount of additive is 30 wt. % or less, a decrease in printability and transferability of the chromogenic laminate member 5 can be reduced, and a decrease in dynamic characteristics of the chromogenic laminate member 5 can be reduced.

The chromogenic laminate member 5 may have a thickness in the range of 25 µm or more and 250 µm or less. When the chromogenic laminate member 5 has a thickness smaller than 25 µm, the chromogenic laminate member 5 may have insufficient physical strength. Further, when the chromogenic laminate member 5 has a thickness smaller than 25 µm, the chromogenic laminate member 5 may suffer wrinkles when printing or the like is performed on the chromogenic laminate member 5. That is, when the chromogenic laminate member has a thickness of 25 µm or more, the chromogenic laminate member can have sufficient physical strength and can prevent wrinkles from occurring when printing or the like is performed on the chromogenic laminate member. On the other hand, when the chromogenic laminate member 5 has a thickness larger than 200 µm, influence of variation in thickness and flexibility of the chromogenic laminate member itself may increase during processing of the chromogenic laminate member 5. That is, when the chromogenic laminate member has a thickness of 200 µm or less, influence of variation in thickness and flexibility of the chromogenic laminate member itself can be reduced during processing of the chromogenic laminate member. The thickness of the chromogenic laminate member 5 may also be in the range of 50 µm or more and 150 µm or less.

The light-developing region 5a of the chromogenic laminate member 5 can be formed by a far-infrared laser including a $CO_2$ laser, a near-infrared pulse laser including an Nd:YAG laser and an Nd:YVO laser, a pulsed visible light laser, an excimer laser, or the like. Further, the laser for forming the light-developing region 5a may be a semiconductor laser, a femtosecond laser, or a picosecond laser. The light-developing region 5a can also be formed by a combination of these lasers.

Lasers capable of emitting light in the infrared range and the oscillation wavelength of these lasers are as follows. GaAlAs semiconductor lasers emit laser light having a wavelength of 635 nm or more and 840 nm or less, and GaAs semiconductor lasers emit laser light having a wavelength of 840 nm. InP semiconductor lasers emit laser light having a wavelength of 910 nm, and YAG lasers emit laser light having a wavelength of 1064 nm.

The owner's information of the light-developing region 5a may be personal identification information. The personal identification information may include either or both of biometric information and non-biometric information. The biometric information is characteristics unique to the individual to be authenticated among biological characteristics. The biometric information may be a sign or pattern such as of the face, fingerprint, vein, and iris. The non-biometric information is personal information other than the biometric information. The non-biometric information may include name, date of birth, age, blood type, gender, nationality, address, legal domicile, telephone number, affiliation, and status (job title). The non-biometric information may be a typed character string, a handwritten signature of the owner, or a combination thereof.

(Hidden Print)

The hidden prints 2, 21, and 42 can be formed by printing ink that cannot be visible with the naked eye but can be seen by an imaging device or by illumination of light outside the visible range. The hidden prints 2, 21, and 42 can be formed by methods such as offset printing, gravure printing, relief printing, intaglio printing, screen printing, inkjet printing, and laser printing. By these printing methods, the owner's information can be recorded as the hidden prints 2, 21, and 42.

The hidden prints 2, 21, and 42 can be formed by drawing with a laser on ink that develops color by irradiation with a laser beam or ink that is inactivated by irradiation with a laser beam. The ink that is inactivated by irradiation with a laser beam may be fluorescent ink or infrared absorbing ink. In the fluorescent ink inactivated by irradiation with a laser beam, the fluorescence emitted from ink is reduced by irradiation of the laser beam. In the infrared absorbing ink inactivated by irradiation with a laser beam, the infrared absorption rate is decreased by irradiation by the laser beam.

These inks for printing may be offset ink, letterpress ink, gravure ink, relief ink, intaglio ink, screen ink, or inkjet ink depending on the printing method. The ink may be a resin ink, an oil-based ink, or a water-based ink. Depending on the drying method, the ink may be an oxidative polymerization type ink, a penetrative drying type ink, an evaporation drying type ink, or an ultraviolet curable ink.

The hidden prints 2, 21, and 42 show a sign by absorbing an electromagnetic radiation outside the visible range. The electromagnetic radiation outside the visible range is electromagnetic radiation having the wavelength outside the visible range. On the other hand, the hidden prints 2, 21, and 42 do not show the sign under visible light. In other words, the hidden prints 2, 21, and 42 do not show the sign when visible light is irradiated. The hidden prints 2, 21, and 42 may include a phosphor. The phosphor may be excited with light outside the visible range. Alternatively, the phosphor may not be excited by visible light. If the phosphor of the hidden prints 2, 21, and 42 is not excited by visible light, the phosphor is not excited by light in the visible range. Accordingly, since the phosphor of the hidden prints 2, 21, and 42 is not excited when observing the laminate when irradiated with visible light, it is difficult for the observer to notice that the laminate 1 includes the hidden prints 2, 21, and 42.

In addition, the above light outside the visible range may be light in the infrared range, and the hidden prints 2, 21, and 42 absorb light in the infrared range and may form a sign that can be detected by emitting light in the infrared range. In this case, since the hidden prints 2, 21, and 42 absorb light in the infrared range, the hidden prints 2, 21, and 42 can be recognized by a sign imaged by an infrared illumination and an infrared camera.

The ink for forming the hidden print may be an ink that emits fluorescence when irradiated with a specific light outside the visible range. Further, the ink for forming the hidden print may include a material having an absorption characteristic in the infrared range, in other words, an infrared absorber. The ink for forming the hidden print may be the one that exhibits no or less absorption in the visible range.

The phosphor may be an ultraviolet excitation phosphor or an infrared excitation phosphor. The ultraviolet excitation phosphor may be $Ca_2B_5O_3Cl:Eu^{2+}$, $CaWO_4$, $ZnO:Zn_2SiO_4$: Mn, $Y_2O_2S:Eu$, ZnS:Ag, $YVO_4$:Eu, $Y_3O_3$:Eu, $Gd_2O_2S$:Tb, $La_2O_2S$:Tb, or $Y_3Al_5O_{12}$:Ce. Further, the ultraviolet excitation phosphor may be any mixture thereof. Further, the ultraviolet excitation phosphor may be a mixture of the same or different types of phosphors. In addition, the ultraviolet excitation phosphor is a phosphor that emits fluorescence in the visible range by absorbing ultraviolet radiation irradiated onto each phosphor. Further, the infrared excitation phosphor is a phosphor that emits fluorescence in the visible range by absorbing infrared radiation irradiated onto each phosphor.

The infrared excitation phosphor may be $YF_3$:YB, Er, or ZnS:CuCo. The infrared excitation phosphor may be $LiNd_{0.9}Yb_{0.1}P_4O_{12}$, $LiBi_{0.2}Nd_{0.7}Yb_{0.1}P_4O_{12}$, $Nd_{0.9}Yb_{0.1}Nd_5(MoO_4)_4$, $NaNb_{0.3}Yb_{0.1}P_4O_{12}$, $Nd_{0.8}Yb_{0.2}Na_5(WO_4)_4$, $Nd_{0.8}Yb_{0.2}Na_5(Mo_{0.5}WO_{0.5})_4$, $Ce_{0.05}Gd_{0.05}Nd_{0.75}Yb_{0.25}Na_5(W_{0.7}Mo_{0.3}O_4)_4$, $Nd_{0.3}Yb_{0.1}Al_3(BO_3)_4$, $Nd_{0.9}Yb_{0.1}Al_{2.7}Cr_{0.3}(BO_3)_4$, $Nd_{0.4}P_5O_4$, or $Nd_{0.8}Yb_{0.2}K_3(PO_4)_2$. Further, the infrared excitation phosphor may be any mixture thereof.

Further, the phosphor that emits fluorescence may be a mixture of the same or different types of phosphors. The same type phosphors refer to phosphors having the same crystal structure if they are crystal phosphors or having the same molecular structures if they are non-crystal phosphors, whereas the different type phosphors refer to phosphors having different crystal structures or different molecular structures. For example, a mixture of different crystal sizes of crystals of $LiNd_{0.9}Yb_{0.1}P_4O_{12}$ having the same crystal structure is a mixture of the same type. In addition, for example, a mixture of different crystal sizes of crystals of $LiNd_{0.9}Yb_{0.1}P_4O_{12}$ and crystals of $Nd_{0.9}Y_{0.1}Al_{2.7}Cr_{0.3}(BO_3)_4$ having different crystal structures is a mixture of different types. However, a mixture of crystal and non-crystal solids of the same composition is a mixture of the same type. Hereinafter, the same definition applies to materials such as resins.

When preparing ink containing the phosphor described above, the phosphor contained in the ink is selected and the blending amount is decided based on the detection wavelength, in other words, the emission wavelength of the phosphor, dispersibility, emission intensity, safety, and the like. The phosphor can be dispersed in ink in the range of 2 wt. % or more and 15 wt. % or less, or in the range of 3 wt. % or more and 5 wt. % or less.

When the hidden prints 2, 21, and 42 are formed by printing the above ink, emission of the hidden prints 2, 21, and 42 can be observed by irradiation of ultraviolet radiation by using a black lamp or by irradiation of infrared radiation. The infrared radiation may be light having a wavelength in the range of 700 nm or more and 1200 nm or less.

The infrared absorber may be an organic pigment, an organic dye, or an inorganic pigment. Further, the infrared absorber may be a mixture of organic pigments, a mixture of organic dyes, or a mixture of inorganic pigments. Further, the infrared absorber may be a mixture of organic pigment and organic dye, a mixture of inorganic pigment and inorganic pigment, a mixture of inorganic pigment and organic pigment, a mixture of organic pigment, organic dye, and inorganic pigment. The organic pigment or organic dye may be a phthalocyanine compound, a naphthalocyanine compound, an anthraquinone compound, a diimonium compound, or a cyanine compound. Further, the infrared absorber may be a mixture of the same type or different type of these compounds. The inorganic pigment may be lanthanum hexaboride, cesium tungsten oxide, indium tin oxide, or antimony tin oxide. Further, the infrared absorber may be a mixture of the same composition formula or different composition formula from these inorganic pigments.

The infrared absorber may have a characteristic of absorbing light in the near-infrared range, which is in the range of 700 nm or more and 1200 nm or less. The ink containing an infrared absorber is prepared, and the ink is printed on the first laminate member or the second laminate member by a predetermined printing method. Thus, a hidden print 2 having a predetermined pattern is formed.

The hidden prints 2, 21, and 42 may include a region printed with two or more types of ink having different characteristics of absorption wavelength or characteristics of light emission wavelength. In other words, the hidden print 2 may include a first region formed by a first ink and a second region formed by a second ink. The second ink is different from the first ink in at least one of the characteristics of absorption wavelength or characteristics of light emission wavelength. By preparing the laminate 1 by combining a plurality of inks, which are different in either or both of the characteristics of absorption wavelength and characteristics of light emission wavelength, counterfeiting resistance of the laminate 1 can be improved.

Moreover, the hidden prints 2, 21, and 42 are preferably formed in a region of an area smaller than that of the first laminate members 3 and 11 and the second laminate member 4 and 12. In other words, the hidden print 2 can be formed inside the edge of the first laminate members 3 and 11 and inside the edge of the second laminate members 4 and 12 when viewed in the thickness direction of the laminate 1. In other words, the hidden prints 2, 21, and 42 can be formed in a region except for the end portions of the laminate 1.

With this configuration, it is difficult to recognize the presence of the hidden prints 2, 21, and 42 between the first laminate members 3 and 11 and the second laminate members 4 and 12 when viewed via the end portions of the laminate 1. Further, since the hidden prints 2, 21, and 42 are not present at the end portions of the laminate 1, adhesion between the first laminate members 3 and 11 and the second laminate members 4 and 12 can be firmly maintained to thereby prevent the first laminate members 3 and 11 from peeling off from the second laminate members 4 and 12.

(Security Patch)

The security patch may be an optical structure. The security patch formed of an optical structure is an element whose authenticity can be determined with the naked eye or via a verifier or the like.

The element whose authenticity can be determined with the naked eye may be an element whose authenticity is determined on the basis of light diffraction effect of the element, an element that exhibits different colors depending on the angle at which the element is observed, in other words, generates a color shift, or the like. The element whose authenticity is determined on the basis of light diffraction effect of the element may be a hologram having a relief structure or the like. The element that exhibits different colors depending on the angle at which the element is observed may be a multilayer film in which inorganic compound layers or metal material layers having different optical characteristics are laminated.

The security patch may include a fluorescent material. In such a security patch, the authenticity of the security patch is determined by irradiating the security patch with light of a specific wavelength. The security patch may include a cholesteric liquid crystal layer. In such a security patch, the authenticity of the security patch can be determined by a verifier. The security patch can be verified by this authenticity determination.

As described above, the laminate 1 of the present embodiment includes the security patch 6 having a relief structure. The security patch 6 includes the relief layer 6a, the deposition layer 6c, and the adhesive layer 6d. The relief layer 6a includes the relief surface 6b. In production of the laminate 1, the relief layer 6a, the deposition layer 6c, and the adhesive layer 6d in sequence may be laminated on a support laminate member to form a transfer foil, and then the security patch 6 can be transferred by heat and pressure from the transfer foil to the chromogenic laminate member 5.

The relief layer 6a can be made of a material such as a thermoplastic resin, a thermosetting resin, or an ultraviolet- or electron beam-curable resin. The thermoplastic resin may be an acrylic resin, an epoxy resin, a cellulose resin, a vinyl resin, or a polycarbonate resin. The thermoplastic resin may be a urethane resin obtained by adding polyisocyanate as a cross-linking agent to a melamine-based resin, phenol-based resin, acrylic polyol, polyester polyol or the like having a reactive hydroxyl group to achieve cross-linkage. The ultraviolet or electron beam curable resin may be epoxy (meth) acrylics or urethane (meth)acrylate. The resin for forming the relief layer 6a may be a mixed resin.

The relief layer 6a may be translucent. When the relief layer 6a is translucent, the observer of the laminate 1 can observe the light-developing region 5a and the like via the security patch 6. Methods of recording a sign pattern on the relief surface 6b include a two-beam interference method using a laser as a light source, and methods for producing various holograms. The hologram may be an image hologram, Lippmann hologram, a rainbow hologram, integral hologram, or the like.

Moreover, the uneven pattern on the relief surface 6b can also be formed by transferring the uneven pattern of the original plate to the precursor layer of the relief layer 6a. The uneven pattern of the original plate can be formed by irradiating the surface of a resist with an electron beam and exposing it to draw a stripe pattern as a diffraction grating. Thus, a master plate having an uneven pattern can be obtained.

In this case, the shape of the stripe pattern serving as the diffraction grating and the direction in which the stripe pattern extends can be controlled for each stripe. Accordingly, similarly to the hologram, a desired three-dimensional sign or a changing sign can be recorded on the relief surface 6b. The changing sign refers to a sign including two or more signs that change depending on the angle at which the security patch 6 is observed. Further, it is also possible to divide a stripe pattern for displaying the sign into a plurality of cell areas with different diffraction gratings being recorded in each cell area so that the whole sign is represented by a set of the plurality of cell areas. The shape of each cell area is not specifically limited. Therefore, each cell area may have any shape such as a circle dot, a rectangular dot, and star-shaped dot.

Further, an uneven pattern corresponding to the relief surface 6b can be formed by an induced surface relief forming method. That is, an amorphous thin film of a polymer having azobenzene on a side chain is irradiated with relatively weak light having a wavelength ranging from blue to green, and an intensity of illumination of approximately tens of mW/cm$^2$. This causes polymer molecules to migrate at several μm scale, which results in forming a relief on the surface of the thin film due to unevenness caused by migration of the polymer molecules. Thus, a master plate having an uneven pattern can be obtained.

On the surface of the master plate having the uneven pattern, a metal layer can be formed by electroplating to thereby obtain a press plate, which is a copy of the uneven pattern. Then, the press plate is bonded by thermocompression to the relief layer 6a, and a fine uneven pattern is transferred onto the surface of the relief layer 6a to form the relief surface 6b.

(Deposition Layer)

The deposition layer 6c may be provided on a part or the entirety of the relief surface 6b. The deposition layer 6c can improve the optical function of the security patch 6, and impart additional properties to the security patch 6. The deposition layer 6c may be omitted. The deposition layer 6c may be a metal layer, a silicon oxide layer, or a metal compound layer. The metal for forming the metal layer may be Al, Sn, Cu, Au, Ag, or Co, or an alloy thereof. The deposition layer 6c can be formed by a deposition method. The deposition method may be a vacuum deposition, sputtering, ion plating, or the like. The deposition layer 6c may be partially removed by etching or the like to thereby have a specific contour.

When the deposition layer 6c is translucent, the observer of the laminate 1 can observe the light-developing region 5a via the security patch 6. The translucent deposition layer 6c may be a dielectric layer having a refractive index different from that of the relief layer 6a. The dielectric may be a silicon oxide or a metal compound. The metal compound may be a metal oxide, a metal sulfide, a metal nitride, a metal fluoride, or metal salt. The silicon oxide may be SiO, $Si_2O_3$ or the like. The metal oxide may be $Fe_2O_3$, $TiO_2$, $CeO_2$, CdO, $Sb_2O_3$, $WO_3$, $In_2O_3$, PbO, $Ta_2O_3$, ZnO, $ZrO_2$, $Cd_2O_3$, or $Al_2O_3$. The metal sulfide may be $Sb_2S_3$, CdS, or ZnS. The metal salt may be $PbCl_2$ or the like. The transparent deposition layer 6c can be formed by a deposition method or the like. The deposition method may be vacuum vapor deposition, sputtering, or ion plating.

(Adhesive Layer)

The material for the adhesive layer 6d may be a heat sensitive adhesive or a pressure sensitive adhesive. The base resin of the heat sensitive adhesive may be acrylic resin, polyester-based resin, vinyl chloride-vinyl acetate copolymer resin, ethylene-acrylate copolymer resin, ethylene-methacrylate copolymer resin, polyamide-based resin, polyolefin-based resin, chlorinated polyolefin-based resin, epoxy-based resin, or urethane-based resin. Further, the main agent may be a mixed resin of these resins.

Further, the pressure sensitive adhesive may be a vinyl chloride-vinyl acetate copolymer, polyester-based polyamide, acrylic, butyl rubber, natural rubber, silicon, or polyisobutyl pressure sensitive adhesive. Further, the pressure sensitive adhesive may be a mixture of these pressure sensitive adhesives. The pressure sensitive adhesive may contain an additive. The additive may be an aggregation component, a modification component, a polymerization initiator, a plasticizer, a hardener, a curing accelerator, a tackifier, a filler, a softener, a heat stabilizer, and an antioxidant. The pressure sensitive adhesive may be one additive or a plurality of additives.

The aggregation component may be an alkyl methacrylate flocculant, a vinyl ester flocculant, an acrylonitrile flocculant, a styrene flocculant, or a vinyl monomer flocculant. The aggregation component may contain one or more of these flocculants.

The modification component may be an unsaturated carboxylic acid modifier, a hydroxy group-containing monomer modifier, an acrylonitrile modifier, or the like. The modification component may contain one or more of these modifiers.

The tackifier may be a rosin-based agent, a terpene phenol agent, a terpene agent, an aromatic hydrocarbon-modified terpene agent, a petroleum agent, a coumarone-indene resin agent, a styrene-based agent, a phenol-based petroleum agent, and a xylene agent. The filler may be a powder. The powder may be zinc oxide powder, titanium oxide powder, silica powder, calcium carbonate powder, barium sulfate powder, or the like.

The softener may be process oil, liquid rubber, or plasticizer. The stabilizer may be a benzophenone-based agent, benzotriazole-based agent, or hindered amine-based agent. The antioxidant may be an anilide-based agent, phenol-based agent, phosphite-based agent, or thioester-based agent.

The adhesive layer 6d may have a thickness in the range of 0.1 µm or more and 10 µm or less. Further, the adhesive layer 6d may have a thickness in the range of 1 µm or more and 5 µm or less.

(Printing)

The outer shape of the printing 8 may be a shape such as an identification photo, characters, numbers, signs, designs, or geometric patterns. Thus, information or designs included in the printing 8 can be imparted to the laminate 1. In plan view perpendicular to the plane in which the laminate 1 extends, the printing 8 is formed on the entirety of the laminate 1 or on a part of the laminate 1.

The printing 8 can be formed by printing ink. The printing may be offset printing, gravure printing, relief printing, intaglio printing, screen printing, or inkjet printing.

The ink for printing the printing 8 may be offset ink, letterpress ink, gravure ink, relief ink, intaglio ink, screen ink, or inkjet ink depending on the printing method. The ink may be a resin ink, an oil-based ink, or a water-based ink. The ink may be an oxidative polymerization type ink, a penetrative drying type ink, an evaporation drying type ink, or an ultraviolet curable ink.

The ink for printing the printing 8 may be a functional ink. The printing 8 formed by printing the functional ink has a color that changes according to the angle of light which the laminate 1 is illuminated by, or the angle at which the laminate 1 is observed. The functional ink may be optically variable ink, color shift ink, or pearl ink.

The printing 8 may be formed by an electrophotographic method using a toner. In this case, a toner in which colored particles such as graphite or pigment are attached to charged plastic particles is prepared. The toner is transferred to an object to be printed by making use of static electrical charge. Then, the transferred toner is heated and fixed to the object to be printed to thereby form the printing 8.

EXAMPLES

A material that absorbs light in the near infrared range and does not absorb light in the visible range was provided for preparing ink to form the hidden print 2. The first laminate member 3, which is a white laminate member, was provided, and the ink was printed on the first laminate member 3 in a pattern shape. Thus, the hidden print 2 was formed. At this time, as described above with reference to FIG. 7, the frame printing 2a having a frame shape surrounding the identification photo formed on the identification document 10 as viewed in the thickness direction of the first laminate member 3 was formed. Since the hidden print 2 was formed by printing ink that does not absorb light in the visible range, it was found that the hidden print 2 was difficult to recognize when the first laminate member 3 was observed with the naked eye.

Then, a transfer foil for transferring the security patch 6 onto the chromogenic laminate member 5 was produced. First, a PET film having a thickness of 25 µm was prepared as a support. Then, in order to form the relief layer 6a, an ink containing acrylic urethane was prepared, and a precursor layer having a thickness of 2 μm was formed on the support by gravure printing. After solvent was removed from the precursor layer by volatilizing the solvent contained in the precursor layer, the metal cylinder plate having an uneven relief was pressed against the precursor layer to thereby perform roll forming processing. Thus, the relief layer 6a having the relief surface 6b was formed. When the metal cylindrical plate was pressed against the precursor layer, the press pressure was set to 2 Kgf/cm$^2$, the press temperature was set to 240° C., and the press speed was set to 10 m/min.

Then, a ZnS layer, which is the deposition layer 6c, was formed on the relief surface 6b by vacuum vapor deposition. After that, polyester ink was printed on the deposition layer 6c by gravure printing, and the solvent contained in the ink was volatilized and removed from the ink to thereby form an adhesive layer 6d. Thus, a transfer foil including the security patch 6 was obtained.

The chromogenic laminate member 5 (LEXAN (registered trademark) SD8B94, manufactured by SABIC corporation) having a thickness of 100 μm was prepared. After the transfer foil including the security patch 6 was transferred to the chromogenic laminate member 5 by using a hot stamp transfer device, the support was removed to thereby provide the security patch 6 on the chromogenic laminate material 5. At this time, in the hot stamp transfer device, the transfer temperature was set to 120° C., and the transfer time was set to 1 second. Then, the printing 8 was formed on the surface on which the security patch 6 was located in the chromogenic laminate member 5 by an inkjet printer.

The first laminate member 3, the second laminate member 4, the chromogenic laminate member 5 on which the security patch 6 was transferred, and the transparent protective laminate member 7 were laminated in this order, and these laminate members were laminated by heat and pressure. In the heat and pressure lamination, the temperature was set to 200° C., the pressure was set to 80 N/cm2, and the time was set to 25 minutes. Then, a part of the laminate obtained by the heat and pressure lamination was cut out into a card shape to thereby obtain the laminate 1.

While light was applied via a surface of the first laminate member 3 facing away from the second laminate member 4, and observation was performed by an infrared camera from a position on a side of the transparent protective laminate member 7 which does not face the chromogenic laminate member 5, a laser beam was irradiated onto the laminate 1. More specifically, a laser beam was irradiated onto a front surface of the chromogenic laminate member 5 within a facial image writing area, in other words, an area surrounded by the frame printing 2a in the chromogenic laminate member 5 as viewed in the thickness direction of the laminate 1 to thereby write a facial image. The laser beam was irradiated by using a laser writer (emission wavelength: 1064 nm). Thus, the identification document 10 was obtained.

When the identification document 10 was observed with the naked eye, it was found that the facial images formed by the security patch 6, the printing 8, and the light-developing region 5a were observed at the same time. Further, while light was applied via a surface of the first laminate member 3 facing away from the second laminate member 4, imaging was performed by an infrared camera from a position on a side of the transparent protective laminate member 7 which does not face the chromogenic laminate member 5. Thus, it was found that the hidden print 2, that is, the word "GENUINE" repeated multiple times, as described above in connection with FIG. 11, the frame printing 2a, and a facial image located within an area defined by the frame printing 2a were observed.

The identification document 10 was falsified in the following manner. First, the transparent protective laminate member 7 was peeled off from the chromogenic laminate member 5, and the light-developing region 5a on the front surface of the chromogenic laminate member 5 was scraped off. Then, the chromogenic laminate member 5 was bonded to the transparent protective laminate member 7, and a facial image different from that of a genuine identification document 10 was written by a laser writer as a falsified sign 9. Thus, a falsified identification document 10A was obtained.

While light was applied onto the falsified identification document 10A via a surface of the first laminate member 3 facing away from the second laminate member 4, the falsified identification document 10A was imaged by an infrared camera from a position on a side of the transparent protective laminate member 7 which does not face the chromogenic laminate member 5. Thus, an image of the word "GENUINE" repeated multiple times, as described above in connection with FIG. 14, the frame printing 2a, and a facial image extending outward from the area defined by the frame printing 2a were observed. Thus, it was found that the falsified identification document 10A had been obtained by falsifying the genuine identification document 10.

As described above, according to the first embodiment of the laminate and the identification document, the following effects can be obtained.

(1) If not informed in advance that the laminates 1 and 20 or the identification documents 10, 30, and 40 include the hidden prints 2, 21, and 42, the observer would be highly unlikely to notice the presence of the hidden prints 2, 21, and 42 when observing the laminates 1 and 20 or the identification documents 10, 30, and 40. As a result, even if the laminates 1 and 20 or the identification documents 10, 30, and 40 have been counterfeited, the counterfeit laminates 1 and 20 or the identification documents 10, 30, and 40 are highly unlikely to include the hidden prints 2, 21, and 42. Therefore, authenticity of the laminates 1 and 20 or the identification documents 10, 30, and 40 can be determined by examining whether or not the laminates 1 and 20 or the identification documents 10, 30, and 40 include the hidden prints 2, 21, and 42. Since a counterfeit laminate or identification document can be detected by the presence or absence of the hidden prints 2, 21, and 42, unauthorized use of counterfeits can be reduced or prevented.

(2) The laminates 1 and 20 or the identification documents 10, 30, and 40 include the security patch 6 enclosed between the chromogenic laminate member 5 and the transparent protective laminate member 7, and the chromogenic laminate member 5 in which information that is difficult to counterfeit compared with printing with ink or the like is recorded. Therefore, counterfeiting of the laminates 1 and 20 or the identification documents 10, 30, and 40 is more difficult.

(3) Since the hidden prints 2, 21, and 42 are excited by absorbing light outside the visible range, it is difficult for the observer to notice that the laminates 1 and 20 or the identification documents 10, 30, and 40 include the hidden prints 2, 21, and 42 when the laminates 1 and 20 or the identification documents 10, 30, and 40 are observed in the visible range.

(4) Since the hidden prints 2, 21, and 42 absorb light in the infrared range, the hidden prints 2, 21, and 42 can be recognized by a sign imaged by infrared illumination and an infrared camera.

(5) Authenticity of the laminates 1 and 20 or the identification documents 10, 30, and 40 can also be determined on the basis of whether the hidden prints 2, 21, and 42 are codes including predetermined information, in addition to whether the laminates 1 and 20 or the identification documents 10, 30, and 40 include the hidden print 21. Therefore, unauthorized use of counterfeits can be more reliably reduced or prevented.

(6) In counterfeiting of the identification document 40, it is required to form the first partial code 41 and the second partial code such that the second partial code included in the hidden print 42 complement the first partial code 41 included in the chromogenic laminate member 5. Therefore, counterfeiting of the identification document 40 is more difficult.

(7) Authenticity of the identification document 10 can be determined on the basis of whether the region in which the owner's information is recorded is deviated from the position of the frame printing 2a of the hidden print 2.

(8) Authenticity of the identification documents 30 and 40 can be determined by comparing the owner's information of the chromogenic laminate member 5 with the code information included in the hidden prints 21 and 42, in addition to whether the laminates 30 and 40 include the hidden prints 21 and 42. Accordingly, unauthorized use of counterfeits can be more reliably reduced or prevented.

The first embodiment described above can be modified and implemented as below.

[Code]

The laminates 1 and 20 or the identification documents 10, 30, and 40 may include two codes. In this case, the hidden prints 2, 21, and 42 can include a first code that includes predetermined information, and the chromogenic laminate member 5 can include predetermined information as the light-developing region 5a and a second code different from the first code. Further, one of the first code and the second code can include information to be authenticated, and the other can include information for authenticating the information to be authenticated. Accordingly, the following effects can be obtained.

(9) Since the authenticity of the laminate is determined on the basis of whether the laminate includes both the first code and the second code, unauthorized use of counterfeits can be reduced or prevented with higher reliability compared with the case in which the authenticity is determined on the basis of whether the laminate includes either one of the first code and second code.

In addition, the second code may be included in the printing 8 rather than in the light-developing region 5a.

In the fifth configuration of the present embodiment, the first partial code 41 constituting one code is included in the light-developing region 5a in the chromogenic laminate member 5. However, the first partial code 41 may be included in the printing 8. In such a configuration as well, an effect similar to the above (6) can be obtained.

[First Laminate Member and Second Laminate Member]

The first laminate members 3 and 11 and the second laminate members 4 and 12 may be transparent as described above. In this case, the hidden prints 2, 21, and 42 sandwiched between the first laminate members 3 and 11 and the second laminate members 4 and 12 may transmit light in the visible range. Thereby, even if both the first laminate members 3 and 11 and the second laminate members 4 and 12 are transparent, the hidden prints 2, 21, and 42 are not visible from external observation in the visible range.

The first laminate members 3 and 11 and the second laminate members 4 and 12 may also be opaque as described above. In this case, the hidden prints 2, 21, and 42 sandwiched between the first laminate members 3 and 11 and the second laminate members 4 and 12 may absorb part of light in the visible range. In this case as well, the hidden prints 2, 21, and 42 may not be visible from external observation in the visible range due to the first laminate members 3 and 11 and the second laminate members 4 and 12 being both opaque.

[Print]

The laminate 1 may include only the first laminate member 3, the second laminate member 4, and the hidden print 2, and may not include the printing 8.

[Hidden Print]

The hidden print of the first to fifth the configurations of the present embodiment can be combined. That is, the hidden print can include at least one of a character string, an alignment mark, and a code. In addition, the hidden print can further include numbers and designs.

[Combination of Configurations]

The first to fifth configurations of the present embodiment can be combined. In addition, the combined configuration of the present embodiment can have a synergistic effect.

Second Embodiment of Present Invention

With reference to FIGS. 22 to 26, an identification document of the second embodiment of the present invention will be described. The following description will be made of a first configuration, a second configuration, a third configuration of the present embodiment, a counterfeit example of the identification document, and materials for forming the identification document. These configurations of the present embodiment can be combined with one another. The combined configurations can retain the respective functions and benefits. With these combinations, synergistic functions and benefits can be achieved.

First Configuration of Second Embodiment

Figure 22:
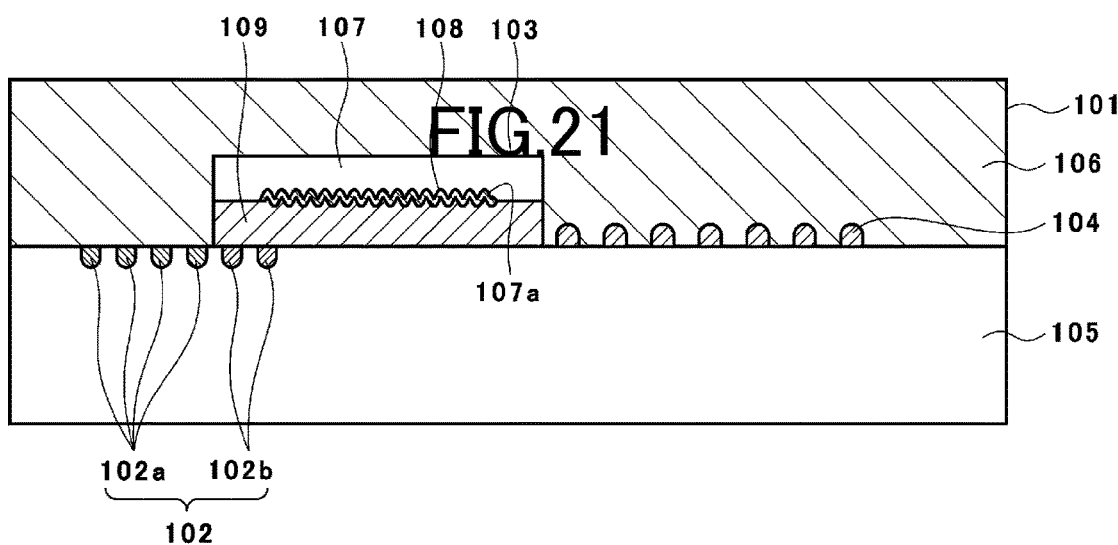
FIG. 22 is a schematic cross-sectional view illustrating a structure of an identification document having a first configuration of a second embodiment.

With reference to FIG. 22, an identification document having a first configuration of the present embodiment will be described.

FIG. 22 illustrates an exemplary cross-sectional structure of an identification document 101.

As shown in FIG. 22, the identification document 101 includes a chromogenic laminate member 105 and a transparent protective laminate member 106. The identification document 101 further includes a security patch 103. The security patch 103 is enclosed between the chromogenic laminate member 105 and the transparent protective laminate member 106.

A printing 104 is disposed at the interface between the chromogenic laminate member 105 and the transparent protective laminate member 106. A surface of the chromogenic laminate member 105 in contact with the transparent protective laminate member 106 is a front surface. In the chromogenic laminate member 105, a light-developing region 102 formed by irradiation with a laser beam is disposed in a region including the front surface. The light-developing region 102 includes a first light-developing region 102a and a second light-developing region 102b. The first light-developing region 102a is a region that develops color when irradiated with a laser beam via the transparent protective laminate member 106. The second light-developing region 102b is a region that develops color when irradiated with a laser beam via the transparent protective laminate member 106 and the security patch 103. In other words, the first light-developing region 102a is a region that overlaps only the transparent protective laminate member 106 when viewed in the thickness direction of the identification document 101. On the other hand, the second light-developing region 102b is a region that overlaps the transparent protective laminate member 106 and the security patch 103 when viewed in the thickness direction of the identification document 101.

The security patch 103 includes an optical functional layer 107, a deposition layer 108, and a tamper proof layer 109. In the security patch 103, the tamper proof layer 109, the deposition layer 108, and the optical functional layer 107 are laminated in this order. The tamper proof layer 109 is in contact with the surface of the chromogenic laminate member 105. The optical functional layer 107 has a relief surface 107a. The deposition layer 108 covers the relief surface 107a. The tamper proof layer 109 has characteristics of developing color when irradiated with a laser beam. The tamper proof layer 109 has adhesiveness to the chromogenic laminate member 105. The tamper proof layer 109 may also have fluorescence characteristics.

In plan view perpendicular to the transparent protective laminate member 106, the light-developing region 102, the security patch 103, and the printing 104 have the same configuration as the light-developing region 5a, the security patch 6, and the printing 8 of the identification document 10 having the second configuration of the first embodiment, respectively.

Second Configuration of Second Embodiment

Figure 23:
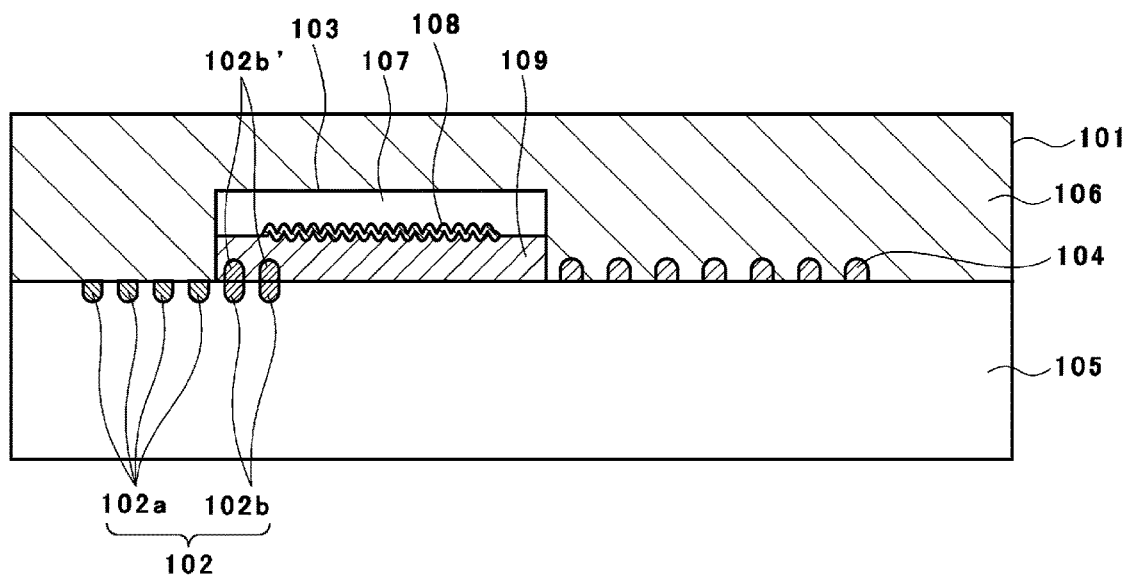
FIG. 23 is a schematic cross-sectional view illustrating a structure of an identification document having a second configuration.

As shown in FIG. 23, the identification document 101 having the second configuration of the present embodiment may include a design recorded region 102b' in which a design is recorded for detecting tampering. The design recorded region 102b' is disposed in the tamper proof layer 109 at a position facing the second light-developing region 102b. In other words, the design recorded region 102b' for detecting tampering overlaps the second light-developing region 102b when viewed in the thickness direction of the identification document 101. In production of the identification document 101 having the second configuration of the present embodiment, the chromogenic laminate member 105 and the tamper proof layer 109 are irradiated with a laser beam to thereby cause a part of the chromogenic laminate member 105 and a part of the tamper proof layer 109 to develop color.

Third Configuration of Second Embodiment

Figure 24:
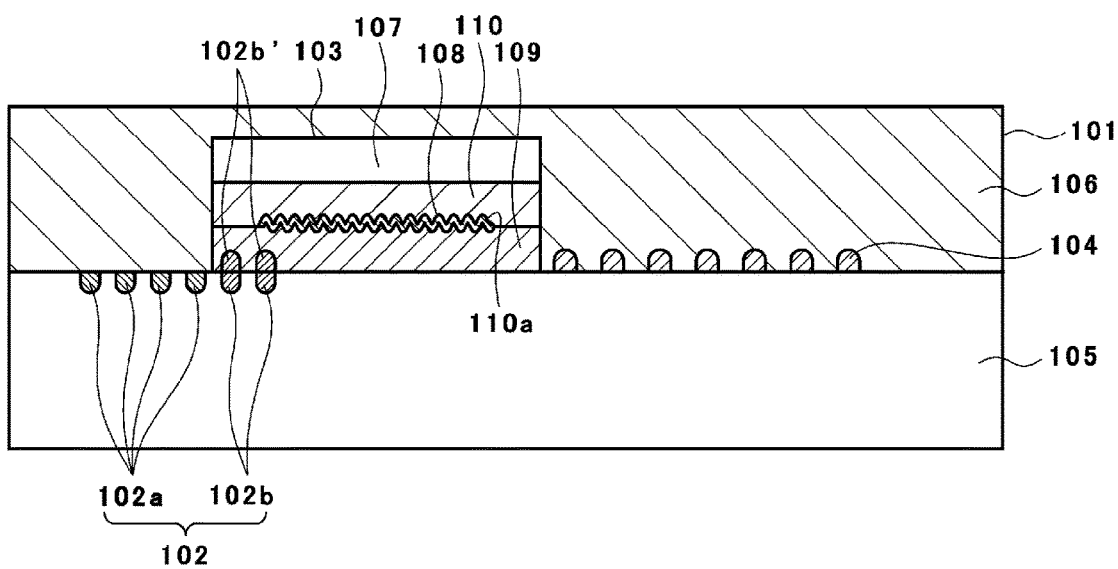
FIG. 24 is a schematic cross-sectional view illustrating a structure of an identification document having a third configuration.

With reference to FIG. 24, an identification document having a third configuration of the present embodiment will be described.

As shown in FIG. 24, in the identification document 101 having the third configuration, the security patch 103 includes a relief layer 110 in addition to the optical functional layer 107, the deposition layer 108, and the tamper proof layer 109. The optical functional layer 107 does not include the relief surface 107a, whereas the relief layer 110 includes a relief surface 110a. The deposition layer 108 covers the relief surface 110a of the relief layer 110. In the security patch 103, the tamper proof layer 109, the relief layer 110, the deposition layer 108, and the optical functional layer 107 are laminated in this order. In the security patch 103, the tamper proof layer 109 is in contact with the chromogenic laminate member 105.

Counterfeit Example of Identification Document

Figure 25:
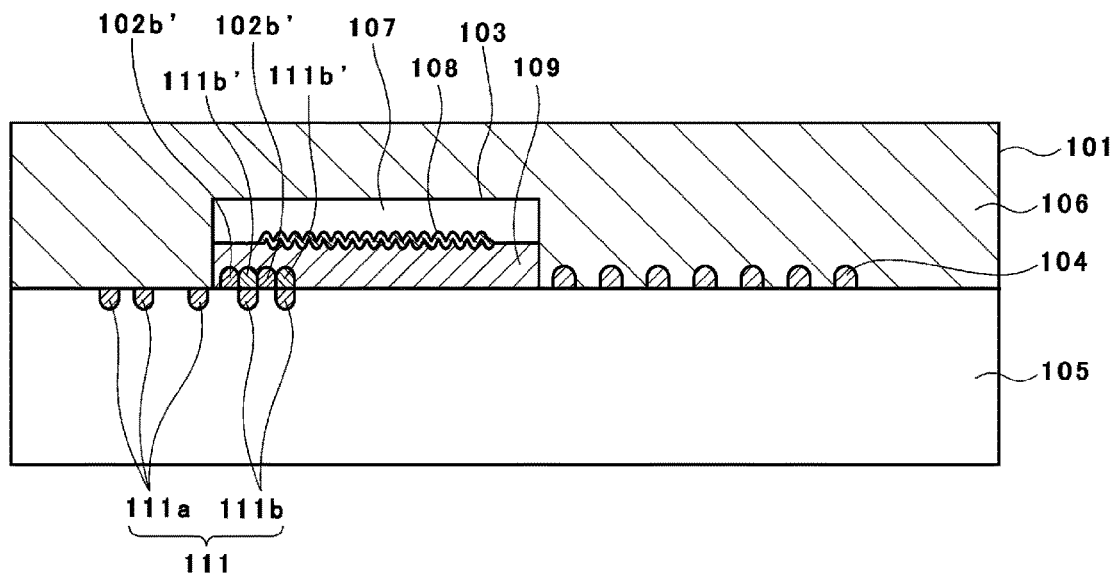
FIG. 25 is a schematic cross-sectional view illustrating a structure of an identification document that is produced by counterfeiting an identification document having a second configuration.
Figure 26:
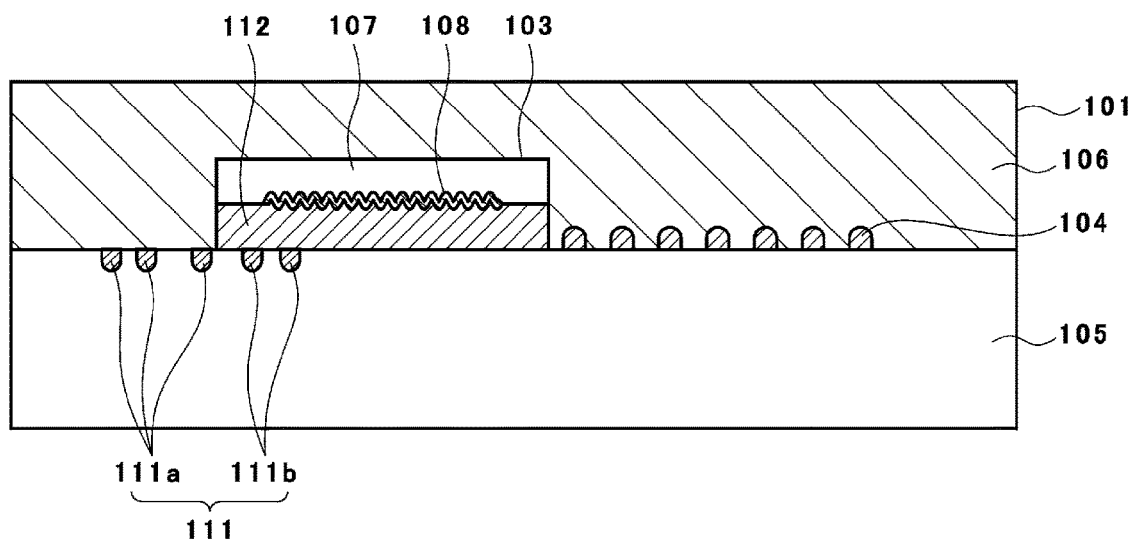
FIG. 26 is a schematic cross-sectional view illustrating a structure of an identification document that is produced by counterfeiting an identification document having a second configuration.

With reference to FIGS. 25 and 26, a counterfeit example of the identification document 101 will be described. In the following description, a counterfeit example of the identification document 101 having the second configuration of the present embodiment will be described. FIGS. 25 and 26 each illustrate the structure of the identification document 101 having the second configuration, which has been counterfeited. Further, a counterfeit object of the identification document 101 obtained in FIG. 26 includes the tamper proof layer 109 having fluorescence characteristics.

FIG. 25 illustrates a structure of the identification document 101 having the second configuration of the present embodiment, which has been counterfeited in the following procedure. That is, the transparent protective laminate member 106 and the security patch 103 are first peeled off from the chromogenic laminate member 105. Then, the light-developing region 102 formed on the front surface of the chromogenic laminate member 105 is scraped off from the chromogenic laminate member 105. Subsequently, the transparent protective laminate member 106 and the security patch 103 are bonded to the chromogenic laminate member 105. Finally, the chromogenic laminate member 105 is irradiated with a laser beam to thereby form a counterfeit light-developing region 111 (111a, 111b, and 111b'). In the counterfeit light-developing region 111, an unauthorized facial image is recorded.

As shown in FIG. 25, in the identification document 101 which has been counterfeited, the design recorded region 102b' remains in the tamper proof layer 109. Accordingly, when the chromogenic laminate member 105 is again irradiated with a laser beam via the security patch 103 for writing to the chromogenic laminate member 105, the design recorded region 102b' and the counterfeit light-developing region 111b' are present in the tamper proof layer 109. Thus, the identification document 101 having only the counterfeit light-developing region 111 as the light-developing region, in which an unauthorized facial image is recorded, cannot be obtained. Therefore, it can be determined whether the identification document 101 according to the second configuration has been counterfeited.

FIG. 26 illustrates a structure of the identification document 101 having the second configuration of the present embodiment, which has been counterfeited in the following procedure. That is, the transparent protective laminate member 106 and the security patch 103 are first peeled off from the chromogenic laminate member 105. Then, the light-developing region 102 formed on the front surface of the chromogenic laminate member 105 is scraped off. Further, the design recorded region 102b' in the security patch 103 is wiped off with a solvent or the like together with the tamper proof layer 109. Then, the pressure sensitive adhesive layer 112 is formed on the optical functional layer 107 of the security patch 103. Subsequently, the transparent protective laminate member 106 and the security patch 103 are bonded to the chromogenic laminate member 105. Finally, the chromogenic laminate member 105 is irradiated with a laser beam to thereby form a counterfeit light-developing region 111. In the counterfeit light-developing region 111, an unauthorized facial image is recorded.

As shown in FIG. 26, since the pressure sensitive adhesive layer 112 does not have characteristics of developing color when irradiated with a laser beam, the pressure sensitive adhesive layer 112 does not develop color when the chromogenic laminate member 105 is irradiated with a laser beam via the security patch 103. Thus, the identification document 101 in which an unauthorized facial image is recorded can be obtained. However, since the tamper proof layer 109 is removed, the identification document 101 does not have fluorescence characteristics. For this reason, when the identification document 101 is verified by a verifier for the identification document 101, fluorescence emission cannot be observed. Accordingly, it can be determined that the identification document 101 is a counterfeit.

[Material for Forming Identification Document]

Hereinafter, among the materials for forming the identification document, materials specific to the identification document 101 having the second embodiment will be described.

(Optical Functional Layer)

Cholesteric liquid crystal can be applied to a material for forming the optical functional layer 107. Cholesteric liquid crystal has a helical periodic structure in a direction perpendicular to the molecular axis such that a pitch of the helical structure has a correlation with light. Accordingly, cholesteric liquid crystal selectively reflects light having a wavelength corresponding to the pitch of the helical structure.

Therefore, when a helical structure having a helical structure pitch capable of reflecting light of a desired wavelength is obtained by controlling the helical structure pitch, the helical structure can be fixed to thereby form the optical functional layer 107 capable of reflecting light of a desired wavelength. The optical functional layer 107 can have a helical structure pitch by which the wavelength of light that is vertically incident on the optical functional layer 107 is in the range of 750 nm or more and 900 nm or less. Further, the optical functional layer 107 can have a helical structure pitch by which the wavelength of light that is obliquely incident on the optical functional layer 107 is in the range of 610 nm or more and 750 nm or less. With this configuration, the optical functional layer 107 is transparent when observed from the front, whereas the optical functional layer 107 is red when observed in an oblique direction.

(Tamper Proof Layer)

As described above, the tamper proof layer 109 has characteristics of developing color when irradiated with a laser beam, fluorescence characteristics, and adhesiveness. Accordingly, materials for forming the tamper proof layer 109 may be materials that can perform these functions.

(Material Having Characteristics of Developing Color when Irradiated with Laser

Beam)

The material having characteristics of developing color when irradiated with a laser beam can be a material that can form the chromogenic laminate member 5 of the first embodiment.

(Material Having Fluorescence Characteristics)

The material having fluorescence characteristics can be a material that emit fluorescence among materials that can form the hidden print of the first embodiment.

(Material Having Adhesiveness)

The adhesive material can be a material that can forms the adhesive layer of the first embodiment.

The second embodiment can also be carried out with the following modifications.

[Combination]

The identification document of the second embodiment can be combined with the laminate and the identification document of the first embodiment.

Third Embodiment of Present Invention

With reference to FIGS. 27 to 36, an identification document of the third embodiment of the present invention will be described. The following description will be given of a first configuration, a second configuration, a third configuration, a fourth configuration, and a fifth configuration of the present embodiment, and materials for forming the identification document. These configurations of the present embodiment can be combined with one another. The combined configurations can retain the respective functions and benefits. With these combinations, synergistic functions and benefits can be achieved.

First Configuration of Third Embodiment

With reference to FIGS. 27 to 33, an identification document having a first configuration of the present embodiment will be described.

Figure 27:
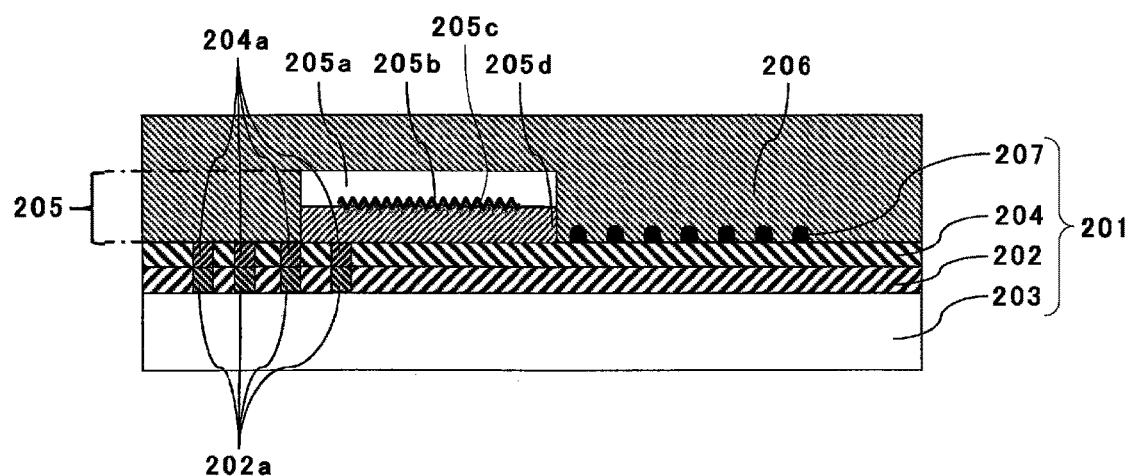
FIG. 27 is a schematic cross-sectional view illustrating a structure of an identification document having a first configuration of a third embodiment.

As shown in FIG. 27, the identification document 201 includes a white laminate member 203, a falsification-proof layer 202, a chromogenic laminate member 204, a security patch 205, and a transparent protective laminate member 206. In the identification document 201, the laminate member 203, the falsification-proof layer 202, the chromogenic laminate member 204, and the transparent protective laminate member 206 are laminated in this order. The security patch 205 is enclosed between the chromogenic laminate member 204 and the transparent protective laminate member 206. The security patch 205 includes a relief layer 205a, a deposition layer 205c, and an adhesive layer 205d. The relief layer 205a includes the relief surface 205b. A surface of the chromogenic laminate member 204 in contact with the transparent protective laminate member 206 is a front surface. The printing 207 is formed on the front surface of the chromogenic laminate member 204.

The falsification-proof layer 202 is made of invisible ink. The invisible ink can be an infrared radiation absorbing ink or the like. The falsification-proof layer 202 is sandwiched between the laminate member 203 and the chromogenic laminate member 204. The falsification-proof layer 202 may have adhesiveness.

The chromogenic laminate member 204 includes the light-developing region 204a. The falsification-proof layer 202 includes an inactive region 202a. When the light-developing region 204a is formed in the chromogenic laminate member 204, the chromogenic laminate member 204 is irradiated with a laser beam via the transparent protective laminate member 206. Thus, a laser beam passes through the transparent protective laminate member 206, or passes through the transparent protective laminate member 206 and the security patch 205 to reach the chromogenic laminate member 204.

Accordingly, a region of the chromogenic laminate member 204 which is irradiated with a laser beam absorbs the laser beam. As a result, the resin contained in the chromogenic laminate member 204 is carbonized to thereby develop color. At the same time, the laser beam also reaches the falsification-proof layer 202, which is an underlayer of the chromogenic laminate member 204. The region of the falsification-proof layer 202 which is irradiated with the laser beam is heated to thereby inactivate an invisible ink contained therein. Thus, the identification document 201 including the chromogenic laminate member 204 having the light-developing region 204a and the falsification-proof layer 202 having the inactive region 202a can be obtained. The inactive region 202a overlaps the light-developing region 204a when viewed in the thickness direction of the identification document 201. The inactive region 202a has a size that does not extend outward from the light-developing region 204a.

In plan view perpendicular to the transparent protective laminate member 206, the light-developing region 204a, the security patch 205, and the printing 207 have the same configuration as the light-developing region 5a, the security patch 6, and the printing 8 of the identification document 10 having the second configuration of the first embodiment, respectively.

Figure 28:
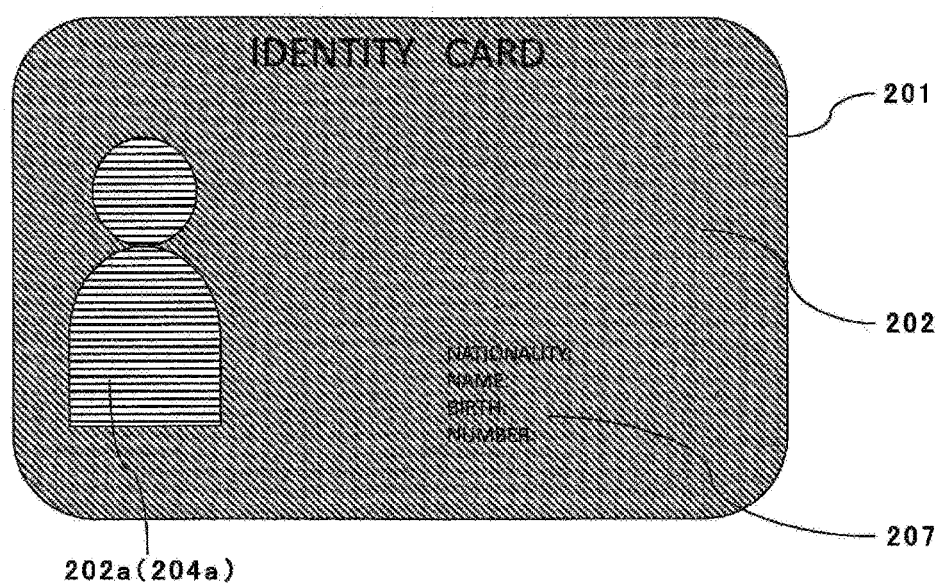
FIG. 28 is a schematic plan view of an image of an identification document having a first configuration, which is captured by using an infrared camera.

FIG. 28 illustrates an image of the identification document 201 when the identification document 201 is observed by an infrared camera in plan view perpendicular to the plane in which the transparent protective laminate member 206 extends. As shown in FIG. 28, when the identification document 201 is observed by an infrared camera, an image recorded in the inactive region 202a of the falsification-proof layer 202 and an image recorded in the light-developing region 204a of the chromogenic laminate member 204 can be observed.

Figure 29:
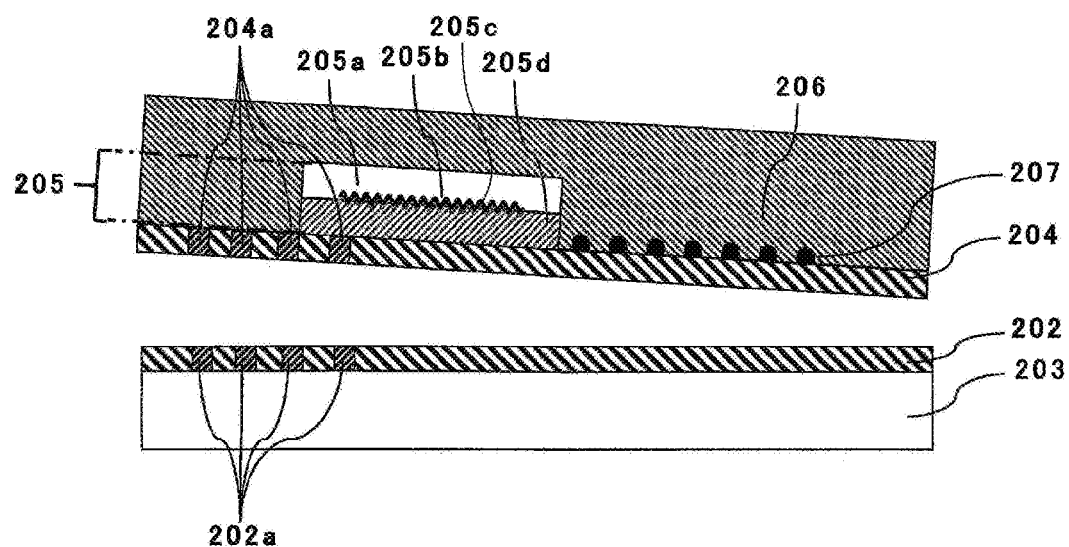
FIG. 29 is a schematic cross-sectional view illustrating that an identification document having a first configuration is divided into two parts.

As shown in FIG. 29, the identification document 201 may be divided into two parts at the interface between the falsification-proof layer 202 and the chromogenic laminate member 204. One of the parts includes the laminate member 203 and the falsification-proof layer 202. The other of the parts includes the chromogenic laminate member 204, the security patch 205, and the transparent protective laminate member 206.

Figure 30:
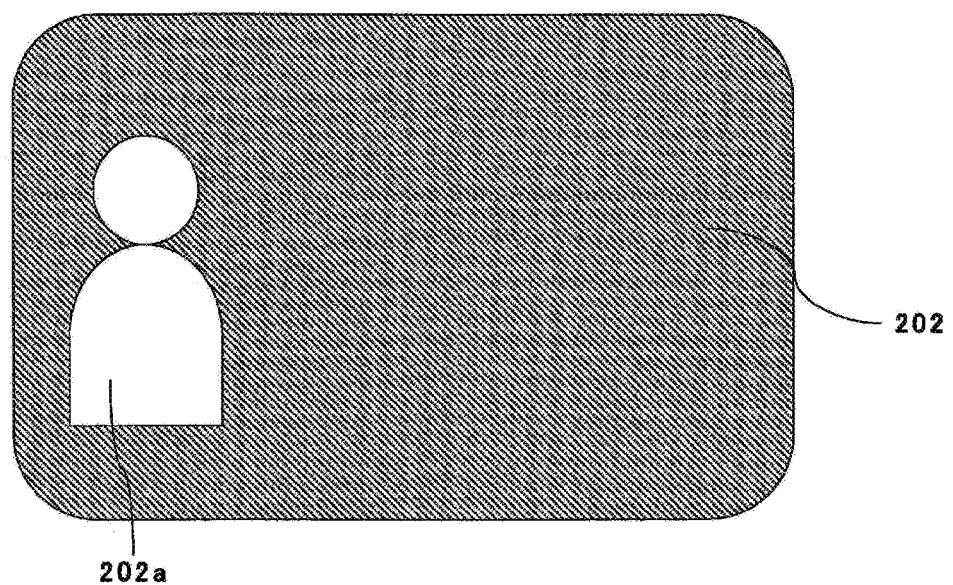
FIG. 30 is a schematic plan view of an image of a laminate composed of a laminate member and a tamper proof layer, which is captured by using an infrared camera.

FIG. 30 illustrates an image of a laminate made up of the falsification-proof layer 202 and the laminate member 203, which is observed by an infrared camera.

As shown in FIG. 30, in the image formed by the falsification-proof layer 202, the inactive region 202a is white. On the other hand, in the image formed by the falsification-proof layer 202, the region other than the inactive region 202a is black. Since the infrared radiation is not absorbed by the inactive region 202a, the inactive region 202a is white.

Figure 31:
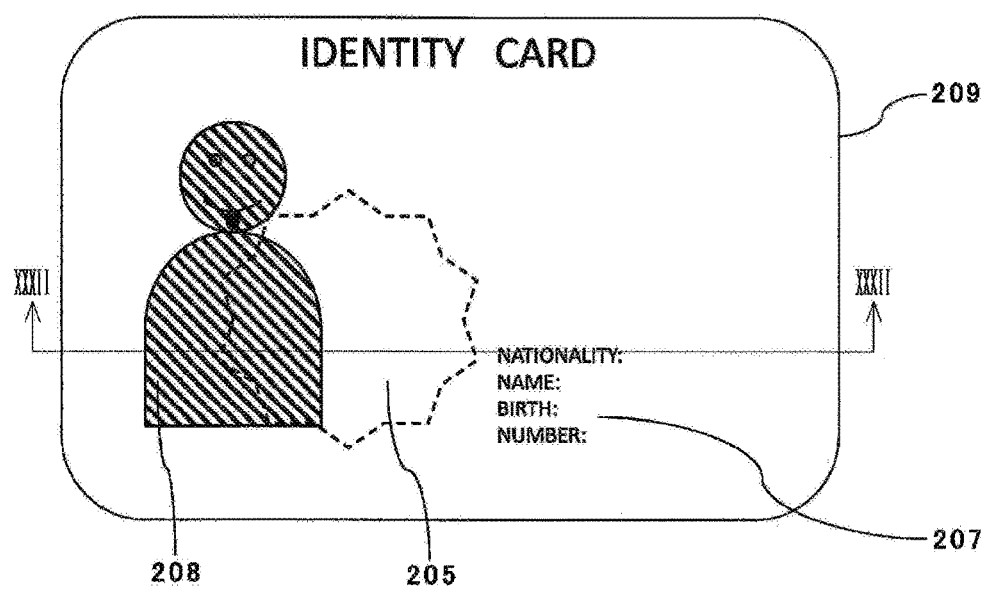
FIG. 31 is a schematic plan view illustrating a structure of an identification document that is produced by counterfeiting an identification document having a first configuration.

FIG. 31 illustrates a planar structure of the falsified identification document.

As shown in FIG. 31, in the identification document 209, an unauthorized image 208 is recorded instead of the image recorded in the light-developing region 204a of the identification document 201. The identification document 209 can be obtained by falsifying the identification document 201 in the following manner. That is, the identification document 201 is first divided into two parts at the interface between the chromogenic laminate member 204 and the falsification-proof layer 202. Then, the chromogenic laminate member 204 in which the light-developing region 204a is formed is removed. Subsequently, a new chromogenic laminate member 204 together with the transparent protective laminate member 206 is bonded to the falsification-proof layer 202. Finally, the chromogenic laminate member 204 is irradiated with a laser beam to thereby record the unauthorized image 208 in the chromogenic laminate member 204. When the identification document 209 is observed with the naked eye, it is not recognized that the identification document 209 has been falsified.

Figure 32:
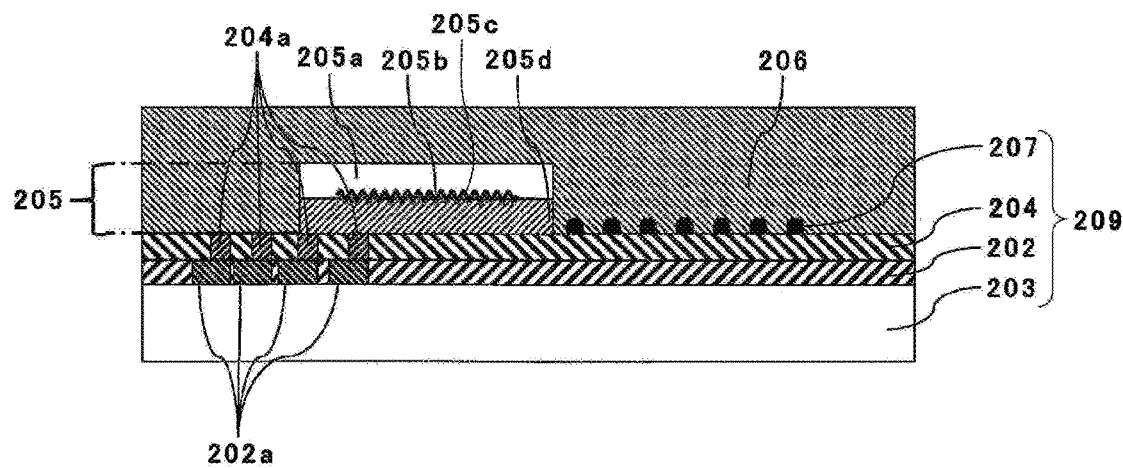
FIG. 32 is a schematic cross-sectional view of the structure taken along the line XXXII-XXXII of FIG. 31.

As shown in FIG. 32, when viewed in the thickness direction of the identification document 209, the inactive region 202a extends outward from the light-developing region 204a. In the falsification-proof layer 202, a region irradiated with a laser beam to record an image in the identification document 201 and a region irradiated with a laser beam to record an authorized image 208 in the identification document 209 are different from each other. Accordingly, in the identification document 209, the inactive region 202a has a size that extends outwards from the light-developing region 204a when viewed in the thickness direction of the identification document 209.

Figure 33:
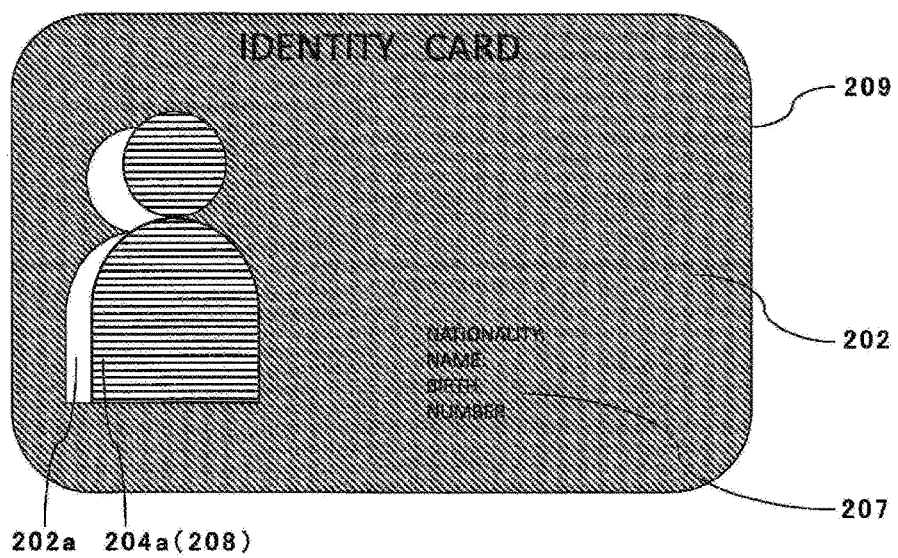
FIG. 33 is a schematic plan view of an image of an identification document that is produced by counterfeiting an identification document having a first configuration, which is captured by using an infrared camera.

FIG. 33 illustrates an image of the identification document 209 when the identification document 209 is imaged by an infrared camera in plan view perpendicular to the plane in which the transparent protective laminate member 206 extends.

As shown in FIG. 33, when the identification document 209 is imaged by an infrared camera, an image recorded in the inactive region 202a and an unauthorized image 208 do not match each other. Thus, it is detected that the identification document 209 has been obtained by falsifying the genuine identification document 201.

Second Configuration of Third Embodiment

Figure 34:
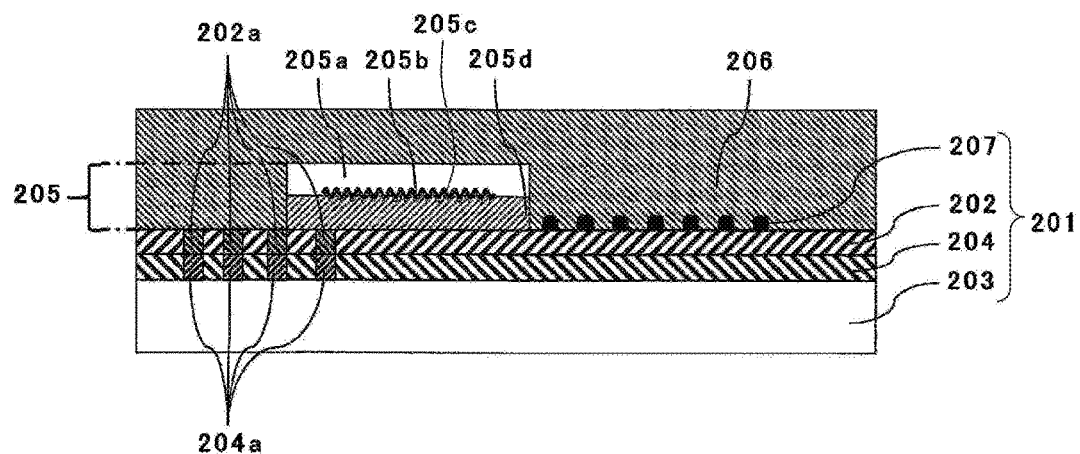
FIG. 34 is a schematic cross-sectional view illustrating a structure of an identification document having a second configuration.

With reference to FIG. 34, an identification document having a second configuration of the present embodiment will be described.

As shown in FIG. 34, the identification document 201 having the second configuration differs from the identification document 201 having the first configuration in that the falsification-proof layer 202 and the transparent protective laminate member 206 are in contact with each other. That is, in the identification document 201, the laminate member 203, the chromogenic laminate member 204, the falsification-proof layer 202, and the transparent protective laminate member 206 are laminated in this order.

When viewed in the thickness direction of the identification document 201, the inactive region 202a of the falsification-proof layer 202 overlaps the light-developing region 204a of the chromogenic laminate member 204. The inactive region 202a has a size that does not extend outward from the light-developing region 204a. Accordingly, falsification of the identification document 201 can also be detected by the identification document 201 having the second configuration, similarly to the identification document 201 having the first configuration.

Third Configuration of Third Embodiment

Figure 35:
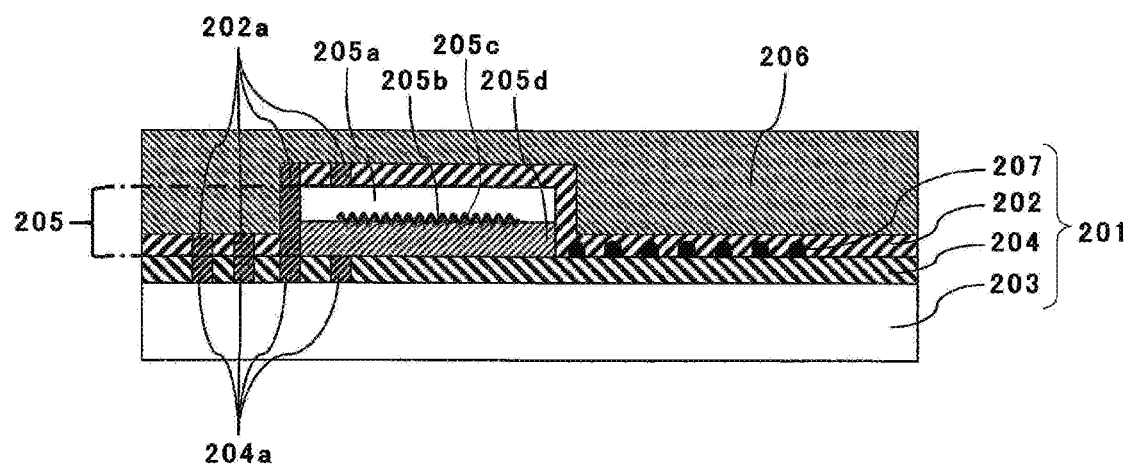
FIG. 35 is a schematic cross-sectional view illustrating a structure of an identification document having a third configuration.

With reference to FIG. 35, an identification document having a third configuration of the present embodiment will be described.

As shown in FIG. 35, the identification document 201 having the third configuration differs from the identification document 201 having the first configuration in that the falsification-proof layer 202 covers the security patch 205 and a region on a surface of the chromogenic laminate member 204 where the security patch 205 is not located. That is, in the identification document 201, the laminate member 203, the chromogenic laminate member 204, the falsification-proof layer 202, and the transparent protective laminate member 206 are laminated in this order. Further, in the identification document 201, the security patch 205 is enclosed between the chromogenic laminate member 204 and the falsification-proof layer 202.

When viewed in the thickness direction of the identification document 201, the inactive region 202a of the falsification-proof layer 202 overlaps the light-developing region 204a of the chromogenic laminate member 204. The inactive region 202a has a size that does not extend outward from the light-developing region 204a. Accordingly, falsification of the identification document 201 is also detected by the identification document 201 having the third configuration, similarly to the identification document 201 having the first configuration.

Fourth Configuration of Third Embodiment

Figure 36:
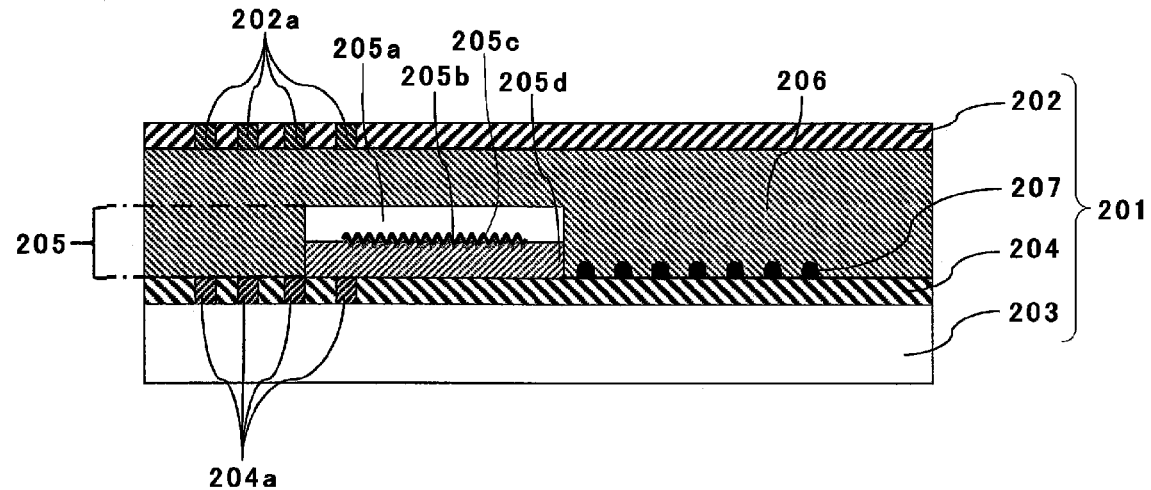
FIG. 36 is a schematic cross-sectional view illustrating a structure of an identification document having a fourth configuration.

With reference to FIG. 36, an identification document having a fourth configuration of the present embodiment will be described.

As shown in FIG. 36, the identification document 201 having the fourth configuration differs from the identification document 201 having the first configuration in that the falsification-proof layer 202 is located outside the transparent protective laminate member 206. That is, in the identification document 201, the laminate member 203, the chromogenic laminate member 204, the transparent protective laminate member 206, and the falsification-proof layer 202 are laminated in this order. Further, the security patch 205 is enclosed between the chromogenic laminate member 204 and the transparent protective laminate member 206.

When viewed in the thickness direction of the identification document 201, the inactive region 202a of the falsification-proof layer 202 overlaps the light-developing region 204a of the chromogenic laminate member 204. The inactive region 202a has a size that does not extend outward from the light-developing region 204a. Accordingly, falsification of the identification document 201 is also detected by the identification document 201 having the fourth configuration, similarly to the identification document 201 having the first configuration.

[Material for Forming Identification Document]
(Falsification-Proof Layer)

The material for forming the falsification-proof layer 202 can be a material that can form the hidden print of the first embodiment.

The third embodiment can also be carried out with the following modifications.

[Combination]

The identification document of the third embodiment of the present invention can be implemented in combination with the laminate and the identification document of the first embodiment of the present invention. Further, the identification document of the third embodiment of the present invention can be implemented in combination with the identification document of the second embodiment of the present invention. The combined embodiments can retain the respective functions and benefits. With these combinations, synergistic functions and benefits can be achieved.

What is claimed is:
1. A laminate comprising:
a first laminate member;
a second laminate member; and
a hidden print formed by printing invisible ink between the first laminate member and the second laminate member, wherein
the hidden print is configured to absorb electromagnetic radiation outside a visible range,
wherein the second laminate member includes a first surface in contact with the hidden print, and a second surface, which is a surface opposite to the first surface, the laminate further comprising:
a chromogenic laminate member that is in contact with the second surface and exhibits color when irradiated with a laser beam;
a security patch that is located on a surface of the chromogenic laminate member on a side opposite to that in contact with the second surface of the second laminate member; and
a protective laminate member that covers the security patch and transmits light in the visible range; and,
when irradiated with electromagnetic radiation outside the visible range that has passed through at least one of the first laminate member and the second laminate member, the hidden print absorbs the electromagnetic radiation to thereby show a sign, and, when irradiated with visible light, the hidden print does not show the sign.

2. The laminate of claim 1, wherein the hidden print includes a phosphor excited by light outside the visible range.

3. The laminate of claim 1, wherein
the first laminate member and the second laminate member are white laminate members, and
the light outside the visible range is light in an infrared range.

4. The laminate of claim 1, wherein the hidden print includes a code including predetermined information.

5. The laminate of claim 1, wherein
the hidden print includes a first code including predetermined information,
the chromogenic laminate member includes a second code including predetermined information as a part that develops color when irradiated with the laser beam, the second code being different from the first code, and
one of the first code and the second code includes information to be authenticated, whereas the other includes information for authenticating the information to be authenticated.

6. The laminate of claim 1, wherein
the chromogenic laminate member includes a first partial code as a part that develops color when irradiated with the laser beam,
the hidden print includes a second partial code, and
the first partial code and the second partial code form one code.

7. An identification document obtained by personalizing the laminate of claim 1, wherein the identification document includes owner's information for identifying an owner of the identification document.

8. The identification document of claim 7, wherein the hidden print includes an alignment mark for positioning a region in which the owner's information is recorded in the identification document.

9. An identification document obtained by personalizing the laminate of claim 1, wherein
the chromogenic laminate member includes owner's information for identifying an owner of the identification document as a part that develops color when irradiated with the laser beam, and
the hidden print includes a code including information associated with the owner's information.

* * * * *